US007593303B2

(12) United States Patent
Ito et al.

(10) Patent No.: US 7,593,303 B2
(45) Date of Patent: Sep. 22, 2009

(54) METHOD OF DETERMINING RECORDING AREA OF MULTI-LAYER OPTICAL DISC, AND RECORDING AND PLAYBACK APPARATUS

(75) Inventors: Seigo Ito, Hanno (JP); Masao Kubo, Kawagoe (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 499 days.

(21) Appl. No.: 11/600,031

(22) Filed: Nov. 16, 2006

(65) Prior Publication Data

US 2007/0109942 A1    May 17, 2007

(30) Foreign Application Priority Data

Nov. 17, 2005    (JP)    ............................. 2005-332980

(51) Int. Cl.
*G11B 3/74*    (2006.01)
*G11B 20/12*    (2006.01)
(52) U.S. Cl. ...................................... 369/94; 369/59.25
(58) Field of Classification Search .................. 369/94, 369/59.29, 275.3, 53.35, 53.36, 53.24
See application file for complete search history.

(56) References Cited

U.S. PATENT DOCUMENTS 7,016,289 B2 *    3/2006    Sasaki ...................... 369/59.25
7,502,285 B2 *    3/2009    Miura et al. .................. 369/94

FOREIGN PATENT DOCUMENTS

JP    2004-310972    11/2004

* cited by examiner

*Primary Examiner*—Thang V Tran
(74) *Attorney, Agent, or Firm*—Finnegan, Henderson, Farabow, Garrett & Dunner, L.L.P.

(57) ABSTRACT

To reduce influence of errors on the outer periphery side of a multi-layer recording disc, a first shifted middle area is assured at a predetermined position nearer to the inner periphery side than the last position of layer on the outer periphery side of a single-sided, multi-layer recording disc, and a second shifted middle area is assured at the position of layer that opposes the shifted middle area assured on layer. A recording layer extending from layer to layer may be shifted in the first and second shifted middle areas, and an area in which errors relatively readily occur on the outer periphery side of the first and second shifted middle areas may not be used.

8 Claims, 13 Drawing Sheets

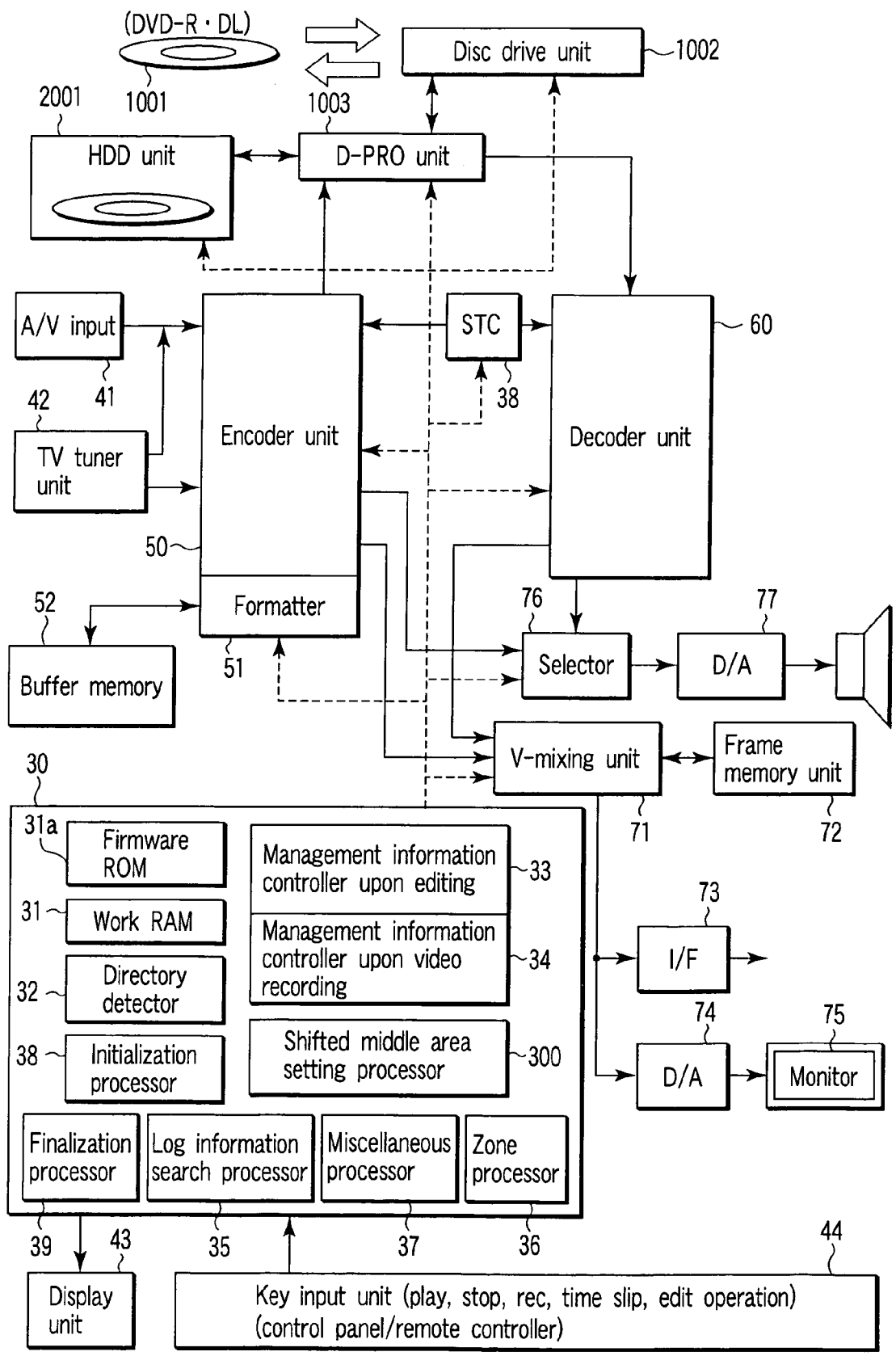
F I G. 11

VAT_ICB with VAT
(On close operation)

| Byte position BP | Length | Field Name | Contents |
|---|---|---|---|
| 0 | 16 | Descriptor Tag | tag(Tag Identifier=261) |
| 16 | 20 | ICB Tag | icbtag(File Type=248) |
| 36 | 4 | Uid | LB32 |
| 40 | 4 | Gid | LB32 |
| 44 | 4 | Permissions | LB32 |
| 48 | 2 | File Link Count | LB16 |
| 50 | 1 | Record Format | Uint8=0(see UDF 2.3.6.1) |
| 51 | 1 | Record Display Attributes | Uint8=0(see UDF 2.3.6.2) |
| 52 | 4 | Record Length | LB32=0(see UDF 2.3.6.3) |
| 56 | 8 | Information Length | LB64 |
| 64 | 8 | Logical Blocks Recorded | LB64 |
| 72 | 12 | Access Time | timestamp |
| 84 | 12 | Mondification Time | timestamp |
| 96 | 12 | Attribute Time | timestamp |
| 108 | 4 | Checkpoint | LB32 |
| 112 | 16 | Exetended Attribute ICB | long_ad |
| 128 | 32 | Implementation Identifier | Entity ID(see UDF 2.1.5) |
| 160 | 8 | Unique Id | LB64(see UDF 2.3.6.7) |
| 168 | 4 | Length of Extended Attributes (=L_EA) | LB32 |
| 172 | 4 | Length of Allocation Descriptors (=L_AD) | LB32 |
| 176 | L_EA | Exetended Attributes | bytes |
| k | 2 | Length of Header (=L_HD) | LB16 |
| k+2 | 2 | Length of Implementation Use (=L_LU) | LB16 |
| k+4 | 128 | Logical Volume Identifier | destring |
| k+132 | 4 | Previous VATICB Location | LB32=c-1 |
| k+136 | 4 | Number of Files | LB32=2 |
| k+140 | 4 | Number of Directories | LB32=2 |
| k+144 | 2 | Minimum UDF Read Revision | LB16=0200h |
| k+146 | 2 | Minimum UDF Write Revision | LB16=0200h |
| k+148 | 2 | Maximum UDF Write Revision | LB16 |
| k+150 | 2 | Reserved | 00h bytes |
| k+152 | L_IU | Implementation Use | bytes |
| k+152+L_IU | 4 | VAT entry for File Set Descriptor | LB32=16 |
| k+156+L_IU | 4 | VAT entry for File Entry(Root Direcrory) | LB32=b+4 |
| k+160+L_IU | 4 | VAT entry for File Entry(DVD_RTAV) | LB32=b+2 |
| k+164+L_IU | 4 | VAT entry for File Entry(VR_MOVIE.VRO) | LB32=a+16 |
| k+168+L_IU | 4 | VAT entry for File Entry(VR_MANGR.IFO) | LB32=b |

FIG. 13

METHOD OF DETERMINING RECORDING AREA OF MULTI-LAYER OPTICAL DISC, AND RECORDING AND PLAYBACK APPARATUS

CROSS-REFERENCE TO RELATED APPLICATIONS

This application is based upon and claims the benefit of priority from Japanese Patent Application No. 2005-332980, filed Nov. 17, 2005, the entire contents of which are incorporated herein by reference.

BACKGROUND

1. Field

One embodiment of the invention relates to improvement of a recording method for a single-sided, multi-layer information recording medium. More particularly, one embodiment of the invention relates to a method of determining an area range used in recording for a single-sided, multi-layer recording type optical disc (for at least two neighboring layers of a disc having three or more layers on one side), a finalization processing method, and a recording or playback apparatus using this disc.

2. Description of the Related Art

As media for large-capacity information recording, optical discs represented by digital versatile discs (DVDs) have been prevalently used. In recent years, a demand has arisen for long-term video recording at a high bit rate along with broadcasting with high image quality. As one of approaches to meet such demand, multi-recording layers are adopted. Especially, a demand for single-sided, multi-layer discs which need not be turned over in actual use is high. As typical examples of single-sided, multi-layer information recording media, DVD+R/DL, DVD-R/DL, and the like are known.

As DVD+R and DVD-R media, those for single layer recording (to be abbreviated as SL hereinafter) and those for dual layer recording (to be abbreviated as DL hereinafter) are available (a disc which has one recording layer on each of both the sides of the disc, and cannot perform recording or playback for the two layers on the two sides from one side of the disc is handled as SL). In recording of DL media, normally, layer 0 as the 0th layer (first recording layer L0) undergoes recording from the inner periphery toward the outer periphery of a medium to a position in front of a (pre-set, fixed) middle area. Then, the layer is switched, and layer 1 as the 1st layer (second recording layer L1) undergoes recording from the outer periphery toward the inner periphery.

In disc media such as DVDs and the like, write errors tend to occur more frequently as the write position moves from the inner periphery toward the outer periphery of a medium (surface run-out of a rotating disc tends to increase at the outer periphery side more than that at the inner periphery side). As one of methods of avoiding recording reliability drop due to frequent occurrence of errors, a method which inhibits use of the outer periphery side of a disc is known. More specifically, for example, as shown in FIG. 3, the switching position of the recording layer from layer 0 (L0 layer) to layer 1 (L1 layer) is shifted to a shifted middle area which is nearer to the inner periphery side than the fixed middle area on the outer periphery side, and an area on the outer periphery side of the shifted middle area is not used in recording. A technique itself for setting such shifted middle area is known (see Jpn. Pat. Appln. KOKAI Publication No. 2004-310972).

In Jpn. Pat. Appln. KOKAI Publication No. 2004-310972, the shifted middle area is set according to the user data size to be recorded. However, the aforementioned frequent occurrence of errors is different for respective discs, and also changes depending on a disc loading state to a drive to be used. Hence, in consideration of frequent occurrence of errors (or recording reliability drop), the method of setting the shifted middle area based on the user data size does not suffice.

In DL media, different time periods are to be taken for finalization from a state in which recording has been done up to the middle of the 1st layer (second recording layer L1=layer 1), and that from a state in which recording has been done up to the middle of the 0th layer (first recording layer L0=layer 0). That is, in the state shown in FIG. 2, the application side or drive writes data (lead-out or all'0 stuffing) to set the same recorded states of 0th layer L0 and 1st layer L1, and pre-processing for finalization takes much time.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 11 is an exemplary block diagram for explaining an overview of a video recording apparatus according to one embodiment of the invention;

FIG. 13 is an exemplary view showing a practical example of log information (VAT_ICB with VAT) recorded at the end of a zone in a recording area;

DETAILED DESCRIPTION

Figure 1:
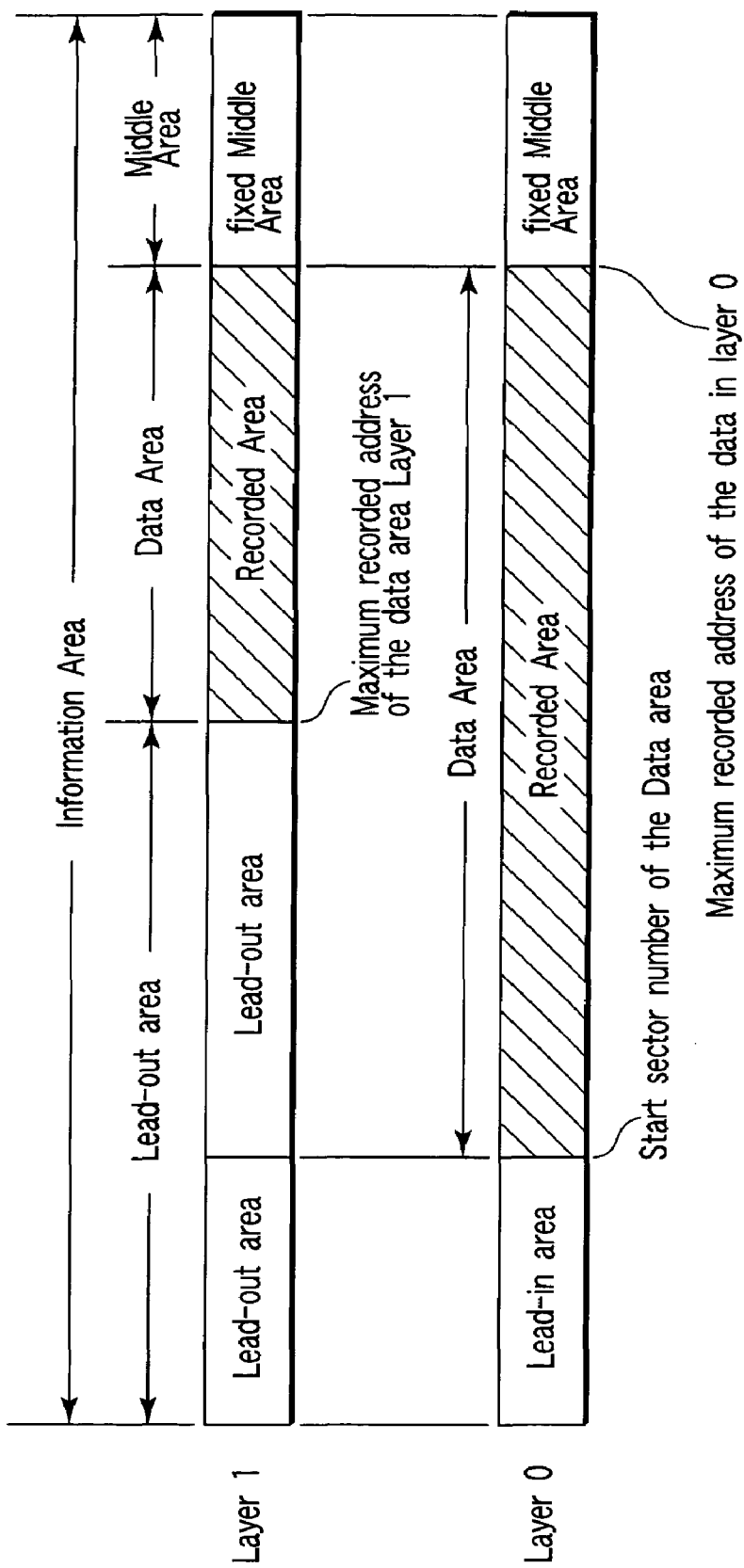
FIG. 1 is an exemplary view for explaining finalization from a state in which recording has been done up to the middle of a 1st layer (layer 1) for a single-sided, multi-layer recording disc (a dual-layer disc or two neighboring layers of a disc having three or more layers on one side)

Various embodiments according to the invention will be described hereinafter with reference to the accompanying drawings. In general, one embodiment of the invention is to reduce the influence of errors on the outer periphery side where reliability relatively becomes low by setting a shifted middle area in accordance with the state of a multi-layer recording disc (not the state on the user data side to be recorded but the state mainly on the disc side).

A recording area determination method according to one embodiment is applied to a multi-layer recording disc which has a first recording layer (L0) which undergoes recording from the disc inner periphery side toward the outer periphery side, and a second recording layer (L1) which undergoes recording from the disc outer periphery side toward the inner periphery side. Upon determining the area range used in recording for this multi-layer recording disc (for at least two neighboring layers of a disc having three or more layers), a first shifted middle area (shifted middle area of L0) is assured at a shift position nearer to the inner periphery side by a predetermined amount (a write amount of the shifted middle area) than the end position of the first recording layer (L0) on the outer periphery side within the range of the predetermined amount (ST54 in FIG. 5), and a second shifted middle area (shifted middle area of L1) is assured at a position of the second recording layer (L1) opposite to the first shifted middle area (shifted middle area of L0) assured on the first recording layer (L0) (ST54 in FIG. 5). In this way, a recording area from the first recording layer (L0) to the second recording layer (11) is shifted in the first and second shifted middle areas (shifted middle areas of L0 and L1).

Note that the positions of the first and second shifted middle areas can be flexibly determined in accordance with an actual use state of the disc of interest. More specifically, the positions of the first and second shifted middle areas can be set at a position nearest to the outer periphery where contiguous recording free from any errors can be done from the inner periphery side as a result of trial write (see FIGS. 6 and 7). Alternatively, repair processing (exchange processing) is normally done if errors have occurred during execution of write. The positions of the first and second shifted middle areas can be set at the head of an area where this repair processing takes place at a certain frequency or higher (the number of times of repair processing exceeds a predetermined threshold) or in front of that area (nearer to the inner periphery side) (see FIG. 8).

Errors relatively readily occur due to the warp of the disc (that causes surface run-out upon rotating) in the area between the first shifted middle area and a fixed middle area on the outer periphery side of the first recording layer (0th layer L0), and the area between the fixed middle area on the outer periphery side and the second shifted middle area of the second recording layer (1st layer L1). For a disc which readily causes errors in these areas in practice, these areas can be inhibited from being used in recording. For this reason, the reliability upon recording and playback of the disc can be improved (if a reduction of the total recording capacity of that disc is allowed). In this way, the possibility of occurrence of a video recording failure during video recording or of playback impossibility of a disc which has been successfully recorded can be reduced.

Figure 2:
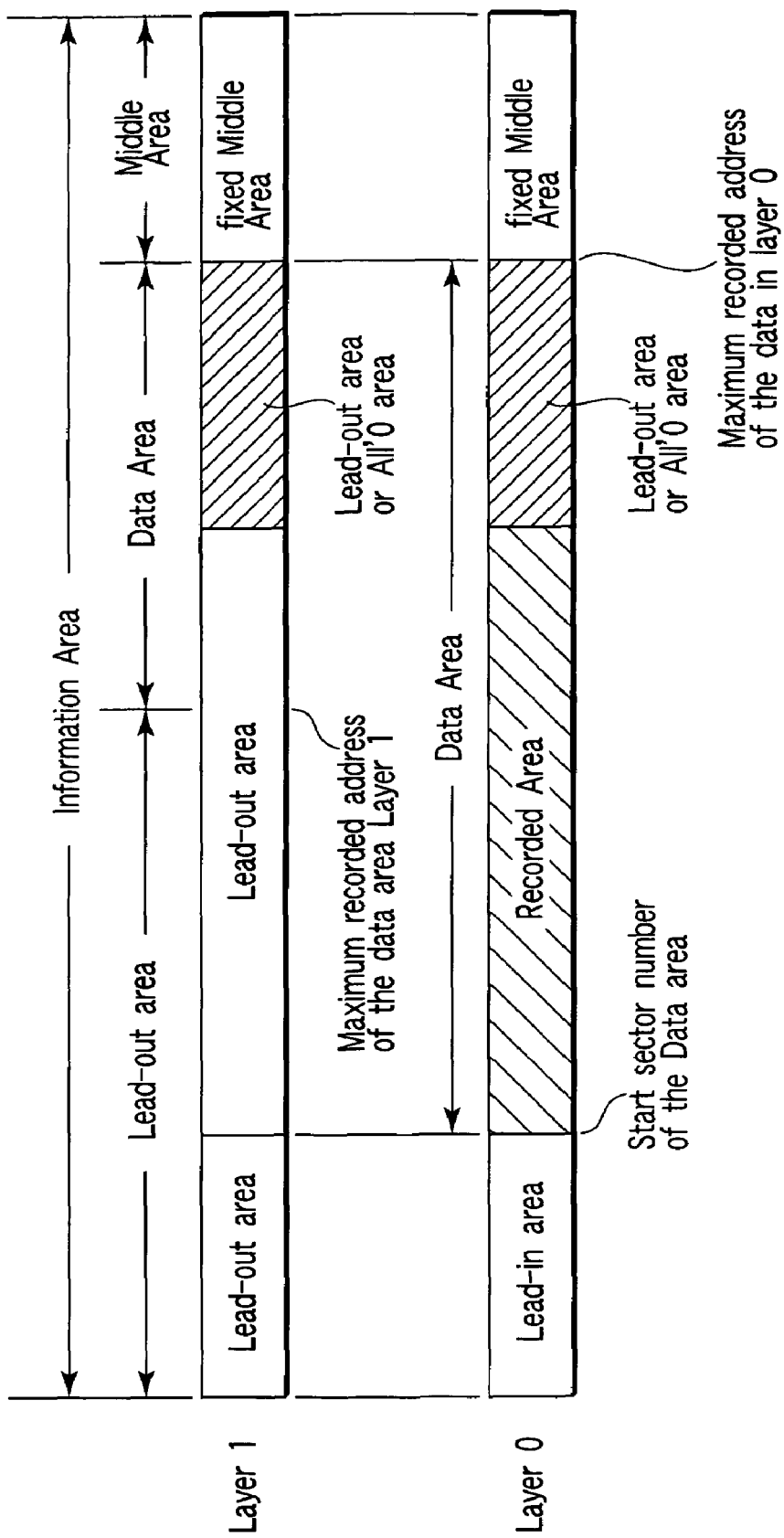
FIG. 2 is an exemplary view for explaining finalization (without setting of any shifted middle area) from a state in which recording has been done up to the middle of a 0th layer (layer 0) for a single-sided, multi-layer recording disc (a dual-layer disc or two neighboring layers of a disc having three or more layers on one side)
Figure 3:
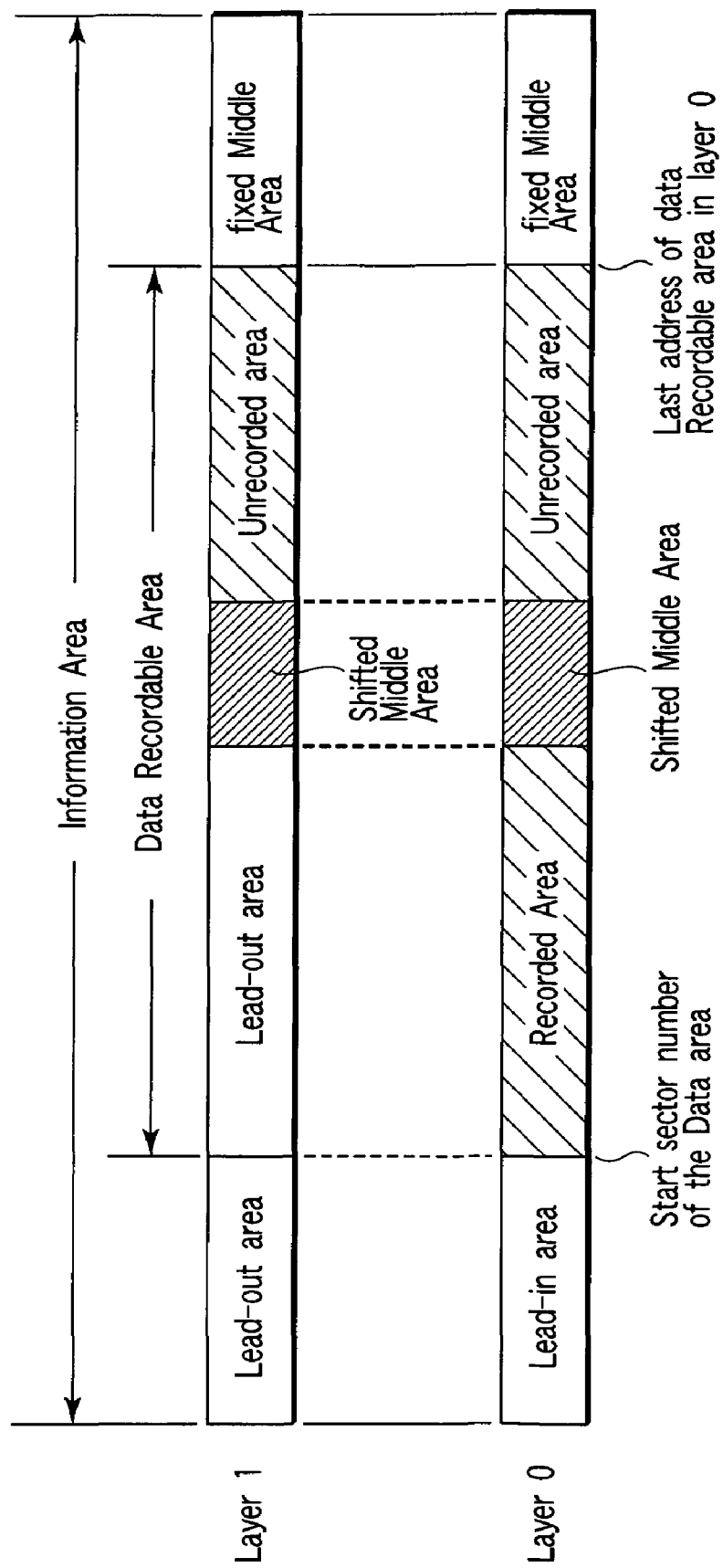
FIG. 3 is an exemplary view for explaining finalization (with setting of a shifted middle area) from a state in which recording has been done up to the middle of a 0th layer (layer 0) for a single-sided, multi-layer recording disc (a dual-layer disc or two neighboring layers of a disc having three or more layers on one side) according to one embodiment of the invention.

One embodiment will be described hereinafter with reference to the accompanying drawings. FIG. 1 exemplifies a finalized state from a state in which recording has been done up to the middle of the 1st layer (layer 1) for a single-sided, multi-layer disc (dual-layer disc). FIG. 2 exemplifies a finalized state from a state in which recording has been done up to the middle of the 0th layer (layer 0) for the single-sided, multi-layer disc (dual-layer disc) (without setting of any shifted middle area). FIG. 3 exemplifies a finalized state from a state in which recording has been done up to the middle of the 0th layer (layer 0) for a single-sided, multi-layer disc (a dual-layer disc or at least two neighboring layers of a disc having three or more layers on one side) according to one embodiment of the invention (with setting of a Shifted Middle layer). In this case, a DVD-R/DL (dual layer) will be exemplified as a single-sided, multi-layer recording disc.

In DL media, different time periods are to be taken for finalization (FIG. 1) from a state in which recording has been done up to the middle of the 1st layer (layer 1), and that (FIG. 2) from a state in which recording has been done up to the middle of the 0th layer (layer 0). Especially, in the state shown in FIG. 2, since the application side or drive writes data (lead-out or all '0 stuffing) to set the same recorded states of the 0th and 1st layers, pre-processing for finalization takes much time. In the embodiment of the invention, using a command (command "shifted middle area" of the drive for shifting a shifted middle area (shifting to the left side in FIG. 3), the shifted middle area (the shift point from the 0th layer to the 1st layer) is set in the middle of a data recording area of the 0th layer, thus setting the same recorded states of the 0th and 1st layers and shortening the finalization time period (in the example of FIG. 3, an unrecorded area on the outer periphery side of the shifted middle area can be excluded from an area which is to undergo the pre-processing for finalization).

As described above, in high-density media such as DVDs and the like, write errors readily occur as the write position moves from the inner periphery side toward the outer periphery of a medium. Upon recording on DL media, the 0th layer undergoes recording from the inner periphery to the outer periphery of the medium up to a position in front of the middle area, the layer is switched, and the 1st layer undergoes recording from the outer periphery to the inner periphery. In such write process, by setting the shifted middle area in advance in the middle of a data recording area, the application side controls a write area on the outer periphery of a medium, thus controlling write accesses on the outer periphery side where errors readily occur. There are some methods of "setting the shifted middle area in advance in the middle of a data recording area", and a representative one of these methods will be described later with reference to FIGS. 5 to 8 and the like.

FIG. 11 is a block diagram showing one embodiment of a video recording apparatus to which the invention is applied. This embodiment shows an apparatus (a DVD-VR recorder with an HDD) which can handle both an optical disc such as a DVD-R and the like, and a hard disc as recording media. Alternatively, a semiconductor memory or the like may be used together as recording media. When blocks are roughly classified in FIG. 11, principal blocks of a recording unit are illustrated on the left side, and those of a playback unit are illustrated on the right side.

The video recording apparatus shown in FIG. 11 has two different disc drive units. That is, the apparatus has disc drive unit 1002 which drives to rotate optical disc (DVD-RAM, DVD±RW, DVD±R, etc.) 1001 as a first medium which is an information recording medium on which video files can be formed, and executes information read and write processes. Also, the apparatus has hard disc drive unit 2001 which drives a hard disc (HDD) as a second medium. Data processor unit 1003 can supply recording data to disc drive unit 1002 and hard disc drive unit 2001, and can receive playback signals. Disc drive unit 1002 has a rotation control system for optical disc 1001, a laser drive system (which uses a red laser having a wavelength of 650 nm or a blue laser having a wavelength of 405 nm or less), an optical system, and the like. Data processor unit 1003 handles data in recording or playback units, and includes a buffer circuit, a modulation and demodulation circuit, an error correction unit, and the like.

The video recording apparatus shown in FIG. 11 includes, as its principal components, encoder unit 50 which forms the video recording side, decoder unit 60 which forms the playback side, and microcomputer block 30 which controls the operation of the overall apparatus. Encoder unit 50 has analog-to-digital converters for video and audio, which respectively convert an input analog video signal and analog audio signal into digital signals, a video encoder, and an audio encoder. Encoder unit 50 further includes a sub-picture encoder. The output from encoder unit 50 is converted into a predetermined DVD-RAM format by formatter 51 including a buffer memory, and the converted data is supplied to data processor unit 1003 described above. Encoder unit 50 receives an external analog video signal and external analog audio signal from A/V input unit 41, or an analog video signal and analog audio signal from TV tuner unit 42.

Upon directly receiving a compressed digital video signal and digital audio signal, encoder unit 50 can directly supply them to formatter 51. Also, encoder unit 50 can directly supply a digital video signal and audio signal, which have been analog-to-digital converted, to video mixing unit 71 and audio selector 76. The video encoder included in encoder unit 50 converts a digital video signal into that which is compressed at a variable bit rate based on the MPEG2 (or MPEG1, MPEG4-AVC, or the like) standard. A digital audio signal is converted into that which is compressed at a fixed bit rate based on the MPEG standard or the like or into that of linear PCM.

When a sub-picture signal is input from A/V input unit 41 (for example, a signal from a DVD-Video player with an independent output terminal of a sub-picture signal or the like) or when a DVD-Video signal with such data configuration is broadcasted and is received by TV tuner unit 42, a sub-picture signal in the DVD-Video signal is encoded (run-length-encoded) by the sub-picture encoder to obtain sub-picture bitmap data. The encoded digital video signal, digital audio signal, and sub-picture data are packed by formatter 51 to obtain video packs, audio packs, and sub-picture packs. Furthermore, these packs are combined and are converted into a format (DVD-Video format) specified by the DVD-Video standard or that (DVD-VR format) specified by the DVD-recording standard.

The apparatus shown in FIG. 11 supplies information (packs of video, audio, sub-picture data, and the like) formatted by formatter 51 and generated management information to hard disc drive unit 2001 or disc drive unit 1002 via data processor unit 1003, and can record them in the hard disc or optical disc 1001. Also, the apparatus can record information recorded in the hard disc or optical disc 1001 on optical disc 1001 or the hard disc via data processor unit 1003 and disc drive unit 1002 or hard disc drive unit 2001. Furthermore, the apparatus can execute edit processing for deleting some of video objects of a plurality of programs recorded in the hard disc or optical disc 1001 or coupling objects of different programs. This is because the DVD-VR format used in the embodiment of the invention defines data units to be handled and facilitates edit processing.

Microcomputer block 30 includes an MPU (microprocessing unit) or CPU (central processing unit), firmware ROM 31a in which control programs and the like (firmware which executes control described in respective flowcharts and the like) are written, work RAM 31 which provides a work area used to execute programs, and the like. The MPU of microcomputer block 30 is configured to execute defective location detection, unrecorded area detection, video recording information recording position settings, UDF recording, AV address settings, log information search processing, shifted middle area setting processing, finalization processing, and the like in accordance with control programs stored in the ROM using the RAM as a work area.

That is, microcomputer block 30 has information processors used to control the entire system, and comprises a VMG (overall video management information) information generator, copy-related information detector, copy and scrambling information processor (RDI processor), packet header processor, sequence header processor, aspect ratio information processor, and the like (none of them are shown), in addition to firmware ROM 31a, work RAM 31, and directory detector 32. Furthermore, microcomputer block 30 comprises processor 36 for executing processing of a zone (Rzone), log information search processor 35, management information controller 34 upon execution of video recording, management information controller 33 upon execution of edit processing, initialization (formatting) processor 38 of single-sided, dual layer (single-sided, multi layer) recordable optical discs (DVD-R/+R, DVD-RW/+RW, and the like), finalization processor 39 of single-sided, dual layer (single-sided, multi layer) recordable optical discs, shifted middle area setting processor 300, and the like. Note that processing for initializing a partially recorded disc or the like is executed by miscellaneous processor 37.

Of the execution results of the MPU, the contents of which the user is to be informed are displayed on display unit 43 of the video data recording and playback apparatus or are displayed as OSD (on-screen display) data on monitor display 75. Microcomputer block 30 has key input unit 44 for inputting operation signals to operate this apparatus. Key input unit 44 corresponds to, e.g., operation switches provided on the main body of the video recording apparatus, a remote controller, or the like. Key input unit 44 may be a personal computer which is connected to the video recording apparatus according to the embodiment of the invention using means such as a wired communication, wireless communication, optical communication, infrared communication, or the like. In any of these forms, when the user operates this key input unit 44, video recording processing of input video and audio signals, playback processing of recorded contents, edit processing to recorded contents, and the like can be applied.

Note that the control timings of disc drive unit 1002, hard disc drive unit 2001, data processor unit 1003, encoder unit 50 and/or decoder unit 60, and the like by microcomputer block 30 are determined based on time data from STC (system time clock) 38. The video recording and playback operations are normally executed in synchronism with time clocks from STC 38, but other kinds of processing may be executed at timings independently of STC 38.

Decoder unit 60 has a separator which separates and extracts respective packs from a signal in the DVD format having a pack structure, a memory used upon execution of pack separation and other kinds of signal processing, a V decoder which decodes main video data (the contents of video packs) separated by the separator, an SP decoder which decodes sub-picture data (the contents of sub-picture packs) separated by the separator, and an A decoder which decodes audio data (the contents of audio packs) separated by the separator. Also, decoder unit 60 comprises a video processor which composites decoded sub-picture data on decoded main video data as needed to output sub-picture data such as a menu, highlight buttons, subtitle, and the like to be superimposed on the main video data.

The output video signal from decoder unit 60 is input to video mixing unit 71. Video mixing unit 71 mixes text data. Also, to video mixing unit 71, lines for directly fetching signals from TV tuner 42 and A/V input unit 41 are connected. To video mixing unit 71, frame memory 72 used as a buffer is connected. When the output from video mixing unit 71 is an analog output, it is externally output via I/F (interface) 73; when it is a digital output, it is externally output via digital-to-analog converter 74.

The output audio signal of decoder unit 60 is digital-to-analog converted by digital-to-analog converter 77 via selector 76, and the converted signal is then externally output. Selector 76 is controlled by a select signal from microcomputer block 30. With this control, selector 76 can directly select a signal which goes through encoder unit 50 upon directly monitoring a digital signal from TV tuner 42 or A/V input unit 41.

Note that formatter 51 of encoder unit 50 generates segmentation information during video recording, and periodically sends it to the MPU of microcomputer block 30 (information upon GOP head interrupt or the like). The segmentation information includes the number of packs of a VOBU, the end address of I-picture data from the head of the VOBU, the playback time of the VOBU, and the like. At the same time, formatter 51 sends information from the aspect information processor to the MPU at the beginning of video recording, and the MPU generates VOB stream information (STI). Note that the STI saves resolution data, aspect data, and the like, and respective decoders perform initial settings based on this information upon playback.

The apparatus in FIG. 11 records one video file per disc. In order to seamlessly continue playback during access (seek) to data, a minimum contiguous information unit (size) is determined. This unit is called a CDA (contiguous data area). The CDA size is a multiple of an ECC (error correction code) block (16 sectors), and a file system performs recording using this CDA size.

Data processor unit 1003 receives data in VOBU units from the formatter of encoder unit 50, and supplies data in CDA units to disc drive unit 1002 or hard disc drive unit 2001. The MPU of microcomputer block 30 generates management information used to play back recorded data, and sends the generated management information to data processor unit 1003 when it recognizes a data recording end command. In this way, the management information is recorded on the disc. Therefore, when encoding is performed, the MPU of microcomputer block 30 receives information (segmentation information and the like) in data units from encoder unit 50. Also, the MPU of microcomputer block 30 recognizes the management information (file system) read from the optical disc or hard disc at the beginning of recording to recognize an unrecorded area of each disc, and sets a recording area on data in the disc via data processor unit 1003.

The video recording apparatus according to the embodiment of the invention can use not only rewritable DVD-RAM discs or DVD-RW discs but also DVD-R discs as write-once media. Formats used to apply video recording to these DVD discs are not uniquely fixed in correspondence with the types of DVD discs. For example, for DVD-R discs, video recording can be carried out using either the DVD-VR format or DVD-Video format.

In the following description, assume that the video recording apparatus according to the embodiment of the invention is a hybrid video recorder having two video recording media, i.e., the DVD and HDD, as shown in the block diagram of FIG. 11 described above, and can dub (or move) video information between the DVD and HDD. However, the contents of the embodiment of the invention are applied not only to the hybrid video recorder but also to a video recorder for the DVD alone (including a DVD recorder which is implemented using a personal computer based on software) having only a video recording function onto DVD discs.

In the video recording apparatus according to the embodiment of the invention, a partial area in a recorded title is called a chapter. For example, in case of video recording in the DVD-VR format, the chapter uses an entry point (EP), which is set in the title and is defined by the DVD-VR standard, as a marker of its boundary. That is, a zone sandwiched between a given EP and the next EP which are set in the title is called a chapter. The start and end points of the title are the boundaries of chapters irrespective of the presence/absence of EPs. Therefore, for the first chapter of the title, no EP is often set at its start point.

When actual data (MPEG-encoded video object or the like) of a chapter between a given EP and the next EP is contiguously recorded on disc 1001, the position of a shifted middle area shown in FIG. 3 can be determined so that the shifted middle area does not interrupt the middle of the recorded area of this chapter. Such position can be determined by setting an EP at a position (corresponding to the divided position of an extent which will be separately explained with reference to FIGS. 5 and 9) corresponding to the shifted middle area when contiguous recording that extends over the shifted middle area is done across the two neighboring layers.

When the layers are switched in the shifted middle area, playback of that part may be instantaneously interrupted depending on the performance (read speed, buffering capability of playback data, and the like) of a player to be used. However, if such instantaneously interrupted part corresponds to a position between neighboring chapters, the user is often oblivious about it. Depending on the video recorded contents, the position of the shifted middle area can be set at the start or end point of a title where no EP is set.

The aforementioned operation for "setting an EP at the position of the shifted middle area (i.e., to prevent the contiguous data of a given chapter from being divided by the shifted middle area)" or the operation for "setting the position of the shifted middle area at the start or end point of a title" can be executed when the title recorded in HDD unit 2001 in FIG. 11 is dubbed (or moved) to DVD-R/DL disc 1001 after a playlist is edited as needed (to extract and sort divided chapters beforehand or the like) (an EP or chapter boundary which will be located at the position of the shifted middle area can be recognized in advance before the beginning of dubbing). In this case, the position of the shifted middle area is determined according to the EP (or chapter boundary or the start or end point of a title) of the video recorded contents.

In the DVD-VR standard Ver 1.1, a DVD_RTAV subdirectory is assured under the root directory, and files specified by the standard are stored under this DVD_RTAV subdirectory. Individual files will be described below.

A VR_MANGR.IFO file stores navigation data for original titles (programs) or playlists. This file corresponds to management information. Playlists and entry points (EPs) are described in this VR_MANGR.IFO file. By changing the description of this VR_MANGR.IFO file in place of direct processing of video data, edit processing for deleting unwanted scenes and the like can be applied. Therefore, when edit processing such as chapter creation, playlist editing, and the like is to be applied, this VR_MANGR.IFO file mainly becomes an object to be processed. In this VR_MANGR.IFO file, time map information for actual video data is written in synchronism with video recording. Since information associated with the overall disc is also written in this VR_MANGR.IFO file, the VR_MANGR.IFO file is immediately created when a DVD disc is formatted.

On the other hand, a VR_MOVIE.VRO file is an AV (Audio Visual) data file of a recorded moving picture, and corresponds to actual video data. This file stores multiplexed packed video data, audio data, and sub-picture data (if it is supported). A VR_STILL.VRO file is an AV data file of a still picture, and corresponds to actual video data as in the VR_MOVIE.VRO file. This file stores packed video data, and also stores multiplexed audio data and sub-picture data as an option in some cases. A VR_AUDIO.VRO file is a data file which stores after-recording audio information for a still picture stored in the VR_STILL.VRO file.

The VR_MOVIE.VRO, VR_STILL.VRO, and VR_AUDIO.VRO files do not exist upon formatting a DVD disc, and are created when video recording is done in practice, thus recording video data and audio data. Note that these three types of files do not always exist. For example, in a video recording apparatus which does not have a still picture recording function or after-recording function, the VR_STILL.VRO and VR_AUDIO.VRO files often do not exist.

The files specified by the DVD-VR standard Ver 1.1 have been described. In addition, for the purpose of improvement of operability and addition of functions of the video recording apparatus, information files unique to that video recording apparatus can be created. In such case, these unique information files are not stored under the DVD_RTAV subdirectory, but they are stored immediately under the root directory or a unique subdirectory created under the root directory.

Figure 12:
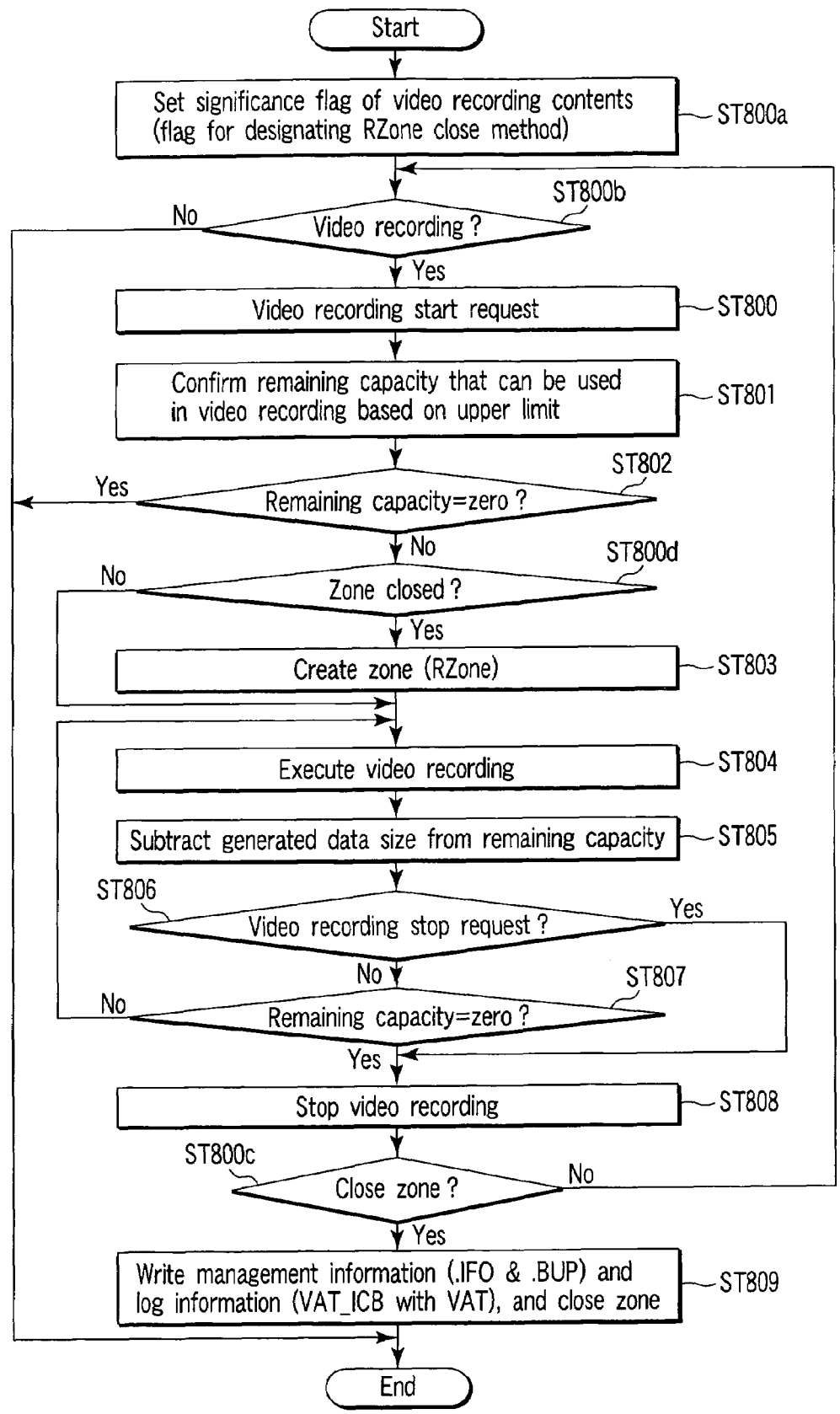
FIG. 12 is an exemplary flowchart for explaining an example of video recording processing in the video recording apparatus according to one embodiment of the invention.

FIG. 12 is a flowchart for explaining an overview of video recording processing in the video recording apparatus according to the embodiment of the invention. When this processing starts, a user menu or dialog box (not shown) is displayed as OSD (on-screen display) data on the screen of monitor 75 in FIG. 11 or the like (block ST800*a*). This OSD display is configured to allow the user to make a flag setting depending on the significance of contents (broadcast program or the like) to be recorded after this.

More specifically, the user can select a flag indicating a significant content (e.g., flag "11"; a default setting) or a flag indicating that the capacity saving takes priority over the certainty of video recording storage (e.g., flag "01", "10", or "00") by operating cursor keys and an enter key on a remote controller (not shown). The flag selected by the user is temporarily stored in, e.g., a memory (work RAM 31 or the like) in the MPU of microcomputer block 30 shown in FIG. 11. If the user selects nothing (default) or selects the flag indicating the significant content by his or her intention (flag "11" in this case), a zone (Rzone) used in that video recording is certainly closed at the end of video recording later (YES in block ST800*c*; as a result, an RMA area and recording area of the disc are partially consumed upon zone closing in every video recording).

On the other hand, if the user selects the flag that gives priority to the capacity saving of the disc in use, he or she can also select a case of only the flag ("00") indicating that "a zone (Rzone) used in that video recording is not closed at the end of video recording" (NO is always determined in block ST800*c* unless the user issues a zone close command), and can further select the following detailed contents.

That is, the user can select via a user menu or the like a flag ("01") indicating that "a zone (Rzone) used in last video recording is closed once every n-th end of video recording (n is an integer equal to or larger than 1)" or a flag ("10") indicating that "a zone (Rzone) used in last recording is closed once every n-th end of video recording when the remaining capacity of the disc in use becomes m % (e.g., when the unused disc capacity becomes only 30%) (m is an integer ranging from 1 to 99)". Note that the user can arbitrarily initially set n and m using a remote controller or the like, or the apparatus of FIG. 11 determines n and m in advance as default values. For example, when n=2 and m=30 are set, if the user selects the flag "01", a zone is closed once per two video recording operations (the RMA area and recording area to be consumed upon closing the zone are saved for one video recording operation) irrespective of the remaining capacity of the disc. If the user sets the flag "10", when the remaining capacity of the disc is 31% or more, a zone is closed every end of video recording. However, when the remaining capacity becomes 30% or less (detected in, e.g., block ST807), a zone is closed once per two video recording operations (the RMA area and recording area to be consumed upon closing the zone are saved only when the remaining capacity becomes small).

After the user sets the flag (or after the user sets nothing, i.e., he or she selects the default setting "11"), if he or she presses a video recording button on the remote controller (not shown) or programmed video recording starts based on a video recording programming timer (YES in block ST800*b*), a video recording start request is called (block ST800). Next, the remaining capacity of a recording area that can be used in video recording is checked (block ST801). In next block ST802, the processing branches by determining if the remaining capacity that can be used in video recording is substantially zero prior to the beginning of actual video recording. If the remaining capacity that can be used in video recording is substantially zero (not only the case in which the remaining capacity is strictly zero but also the case in which the remaining capacity will become completely zero in a few minutes even when the video recording starts can be included in the case of substantially zero), a series of processes end without executing the subsequent video recording processing.

On the other hand, if the remaining capacity that can be used in video recording is not zero, it is checked if a zone is closed at that time (block ST800d). If the zone is closed (YES in block ST800d), a zone for recording AV data (realtime data) is created on a recording area of the disc (block ST803), and the flow advances to block ST804 to start video recording. If a zone is not closed at the time after the remaining capacity checking in block ST802 (NO in block ST800d after NO in block ST800c), the control skips block ST803 and jumps to video recording processing in block ST804 (this corresponds to, e.g., processing for starting recording of realtime data without closing that zone after recording realtime data and a change file/VAT_ICB).

Note that processes in subsequent blocks ST804 to ST807 are mainly video recording and checking of the remaining capacity. In these blocks, the remaining capacity is checked while performing video recording. Since video recording and remaining capacity checking are alternately executed in very small time units, they are almost parallelly executed from a macroscopic viewpoint. That is, video recording processing is executed in block ST804. In block ST805, the capacity of data generated by video recording is subtracted from the remaining capacity of the recording area. It is monitored in block ST806 if a video recording stop request is called. Such video recording stop request is called when, for example, the user stops manual video recording by a direct operation, programmed video recording is stopped based on the timer setting, the user stops programmed video recording by his or her operation halfway through, or the like. If it is determined that the video recording stop request is called, the control skips next block ST807, and jumps to block ST808. If it is determined that no video recording stop request is called, the control advances to block ST807.

In block ST807, the remaining capacity obtained by subtracting the data capacity generated by video recording in block ST805 is checked to see if the capacity needed to continue video recording still remains, thus branching the processing. If it is determined that the remaining capacity is zero, the flow advances to block ST808. On the other hand, if the remaining capacity is not zero, the flow returns to block ST804 to continue video recording by repeating the processes in blocks ST804 to ST807. In block ST808, video recording is stopped by determining that the remaining capacity becomes zero or the video recording stop request is called, thus ending a series of processes.

Next, it is checked if the zone that has undergone a series of video recording operations is to be closed (block ST800c). This checking block is made based on the flag ("11", "01", "10", or "00") set in block ST800a. That is, if the flag is, e.g., "00", even if video recording is stopped in block ST808, the flow returns to block ST800b without closing that video recording zone. (However, even when the flag is "00", if the user inputs a zone close command by operating the remote controller, that video recording zone is closed.) On the other hand, for example, if n=2 and the flag is "01", the zone is not closed in the first video recording processing in blocks ST800 to ST808 (NO in block ST800c) but that zone is closed in the second video recording processing (YES in block ST800c, ST809).

Such "zone close processing once per n times" can be implemented as follows. That is, a counter (register) in which a numeral value of n is preset is provided in the MPU of microcomputer block 30 in FIG. 11. This counter is counted down one by one every video recording processing, and when the count value becomes zero, the numerical value of n is preset again in the counter after the zone close processing in block ST809 is executed.

Furthermore, for example, if n=5, m=30, and the flag is "10", when the remaining capacity is 31% or more, the video recording zone is closed all the time in block ST809 if it is determined in block ST808 that the video recording is stopped. On the other hand, if the remaining capacity becomes 30% or less, the zone is not closed (NO in block ST800c) in the first to fourth video recording processes in blocks ST800 to ST808, but it is closed in the fifth video recording process (YES in block ST800c, block ST809). (Note that whether or not the remaining capacity becomes m=30% can be confirmed in block ST807 or ST801.) If the flag set in block ST800a is "11", the video recording zone is closed all the time irrespective of the settings of n and m if it is determined in block ST808 that the video recording is stopped.

In this way, the zone that has undergone a series of video recording operations is closed. If the video recording processing ends and the video recording zone is to be closed (YES in block ST800c), management information (VR_MANGR.IFO and its backup file (VR_MANGR.BUP)) corresponding to the video recorded contents is generated, and log information ("VAT_ICB with VAT" to be described later with reference to FIG. 13) is written at the end of the zone in block ST809.

Taking "DVD-VR format recording using a DVD-R disc" as an example, if a series of video recording operations correspond to "Rec 1" of zone 0, video information 1 (VRO file information of AV data) is recorded from the lead-in side of zone 0, management information (VR_MANGR.IFO and VR_MANGR.BUP) is recorded at the end side of zone 0, and log information (VAT_ICB with VAT) is recorded at the end of that zone 0. The end position ($P_{X0}$) of zone 0 can be indicated by, e.g., an address generated in correspondence with the recorded information length of "Rec 1" from the head of zone 0. This address (end position $P_{X0}$ of zone 0) can be written in the log information (VAT_ICB with VAT) recorded at the end of zone 0.

Likewise, if a series of video recording operations in blocks ST804 to ST807 in FIG. 12 correspond to "Rec 2" of zone 1, video information 2 (VRO file information of AV data) is recorded immediately after end position $P_{X0}$ of zone 0, management information (VR_MANGR.IFO and VR_MANGR-.BUP) is recorded on the end side of zone 1, and log information (VAT_ICB with VAT) is recorded at the end of that zone 1. The end position ($P_{X1}$) of zone 1 can be indicated by an address generated in correspondence with the recorded information length of "Rec 2" from end position $P_{X0}$ of zone 0 (=the head of zone 1). This address (end position $P_{X1}$ of zone 1) can be written in the log information (VAT_ICB with VAT) recorded at the end of zone 1. That is, the contents of the log information (VAT_ICB with VAT) reflect a change in recorded contents due to video recording processing and the like.

Note that upon initializing the DVD-R disc, information of the file system such as the volume structure of the UDF (Universal Disk Format) and the like, management information of the initial state, and the like are written in a head area on the lead-in side before the start position of zone 0. This management information often includes information files unique to the video recording apparatus, which are ranked as management information, in addition to the management information such as aforementioned VR_MANGR.IFO, VR_MANGR.BUP, and the like specified in the DVD-VR standard.

The overview of the aforementioned processing (FIG. 12) will be generalized and summarized below. More specifically, processing (block ST800a) for setting the flag (in the memory of the MPU of microcomputer block 30) that designates whether or not a recording zone of interest is to be closed after recording of AV contents (realtime digital data) is provided. If this flag assumes a first state (flag "11"), the recording zone of interest is closed after recording of the AV contents (YES in block ST800c). However, if this flag is other than the first state ("11"), the zone of interest is not closed (flag "00") or the zone is closed once per n times (n is an integer equal to or larger than 1) (flag "01" or "10") depending on the state of the flag.

When the disc in use is a rewritable medium such as DVD-RAM, DVD-RW, or the like, and the recorded contents are to be changed by edit processing or the like, data to be processed can be updated and can be written back to the disc. By contrast, in case of a write-once medium such as DVD-R or the like, when the recorded contents on the disc are changed, or even when a file is partially changed, new data need be recorded again on an unrecorded area on the disc. That is, when the edit processing is applied, the updated data is not overwritten but it is incrementally written. In this case, many pieces of management information such as the management information of that file, information of the parent directory which is linked with that file management information, information of its parent directory, and the like need be re-created, resulting in very poor efficiency.

In order to reduce such inefficiency, when recording is done on a DVD-R disc by incremental write, a special address conversion table called a VAT (Virtual Allocation Table) is to be used according to the UDF standard. By using this table, when the recorded contents of the disc are changed, only the changed data and VAT can be recorded, and enormous quantities of data such as the information of the linked parent directory and the like need not be fully changed and incrementally written. After the management information of the initial state is recorded, a VAT at that time and VAT_ICB used to identify the VAT are written as log information (VAT_ICB with VAT) at the end of the information area which is written upon initialization.

The configuration common to the single-sided, single-layer DVD-R and the single-sided, dual-layer DVD-R/DL has been described. On the DVD-R/DL, an information area for the DL volume structure and file structure is assured on the lead-out side. The "DL volume structure and file structure" on the lead-out side can be the same as the "volume structure and file structure" on the lead-in side (LSN=0 to 65), but information contents recorded in this area are different.

An area obtained by subtracting that of information written upon initialization is a recording area that can be used to incrementally write data by video recording, edit processing, and the like. In one embodiment of the invention, a first data size assigned to save data for edit processing, and a second data size assigned for video recording can be assured in this recording area. Note that the remaining capacity can be recognized by detecting the logical address (or "Last recorded address of Rzone#n" in the RMA area) which is recorded in, e.g., the file system and is recognized as the address used by bitmap information that indicates the recorded state of physical sectors or logical sectors or the management information.

FIG. 13 shows a practical example of the log information (VAT_ICB with VAT) recorded at the end of the zone in the recording area. This log information can be generated upon execution of the processing for closing a zone (block ST809 in FIG. 12), and is configured to include the following information in numerical order of byte position BP.

That is, a descriptor tag is stored at first byte position BP=0. There are two types of tags: one type of the tag is a descriptor tag for the volume structure specified by the UDF, and other type of the tag is a descriptor tag for the file structure specified by the UDF. In the file structure for DVD-R, a VAT (Virtual Allocation Table) and VAT_ICB (Virtual Allocation Table Information Control Block) are recorded in an incremental recording mode. To virtual addresses in the incremental recording mode, the following contents are assigned. That is, virtual address=0 is used for a file set descriptor, and virtual address=1 is used for an ICB root directory. Virtual addresses=2 to 255 are assigned to the DVD_RTAV directory, and file entries of files recorded under the DVD_RTAV directory. By assigning the log information (VAT_ICB with VAT) including such contents to the end of each zone, the recorded contents of each zone can be managed.

Figure 14:
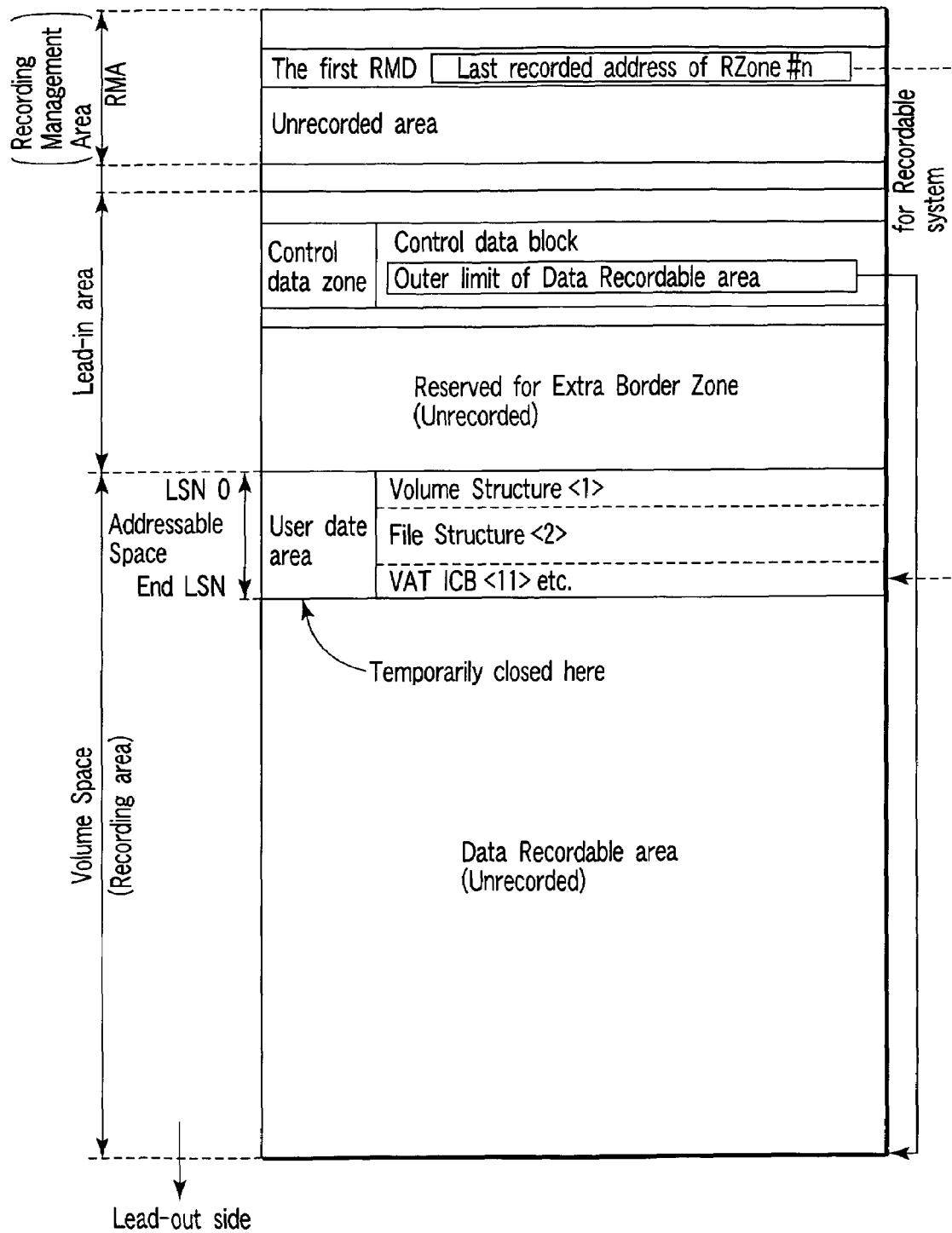
FIG. 14 is an exemplary view for explaining the state of a write-once medium after initialization.

FIG. 14 is a view for explaining the state of a write-once medium (DVD-R disc or the like) after initialization. This medium has a recording management area (RMA) on the lead-in side (innermost periphery side of the disc), and control data in a lead-in area that follows the RMA, and a user data area is formed in a volume space (recordable area) that follows the lead-in area. This user data area is written with information of the volume structure, file structure, and virtual allocation table information control block (VAT_ICB), and that area (zone) is temporarily closed there. New information recording is made after the closed zone toward the lead-out side. Note that the end position of the closed zone can be detected from a first RMD (the last recorded address of Rzone#n) recorded in the RMA.

Figure 15:
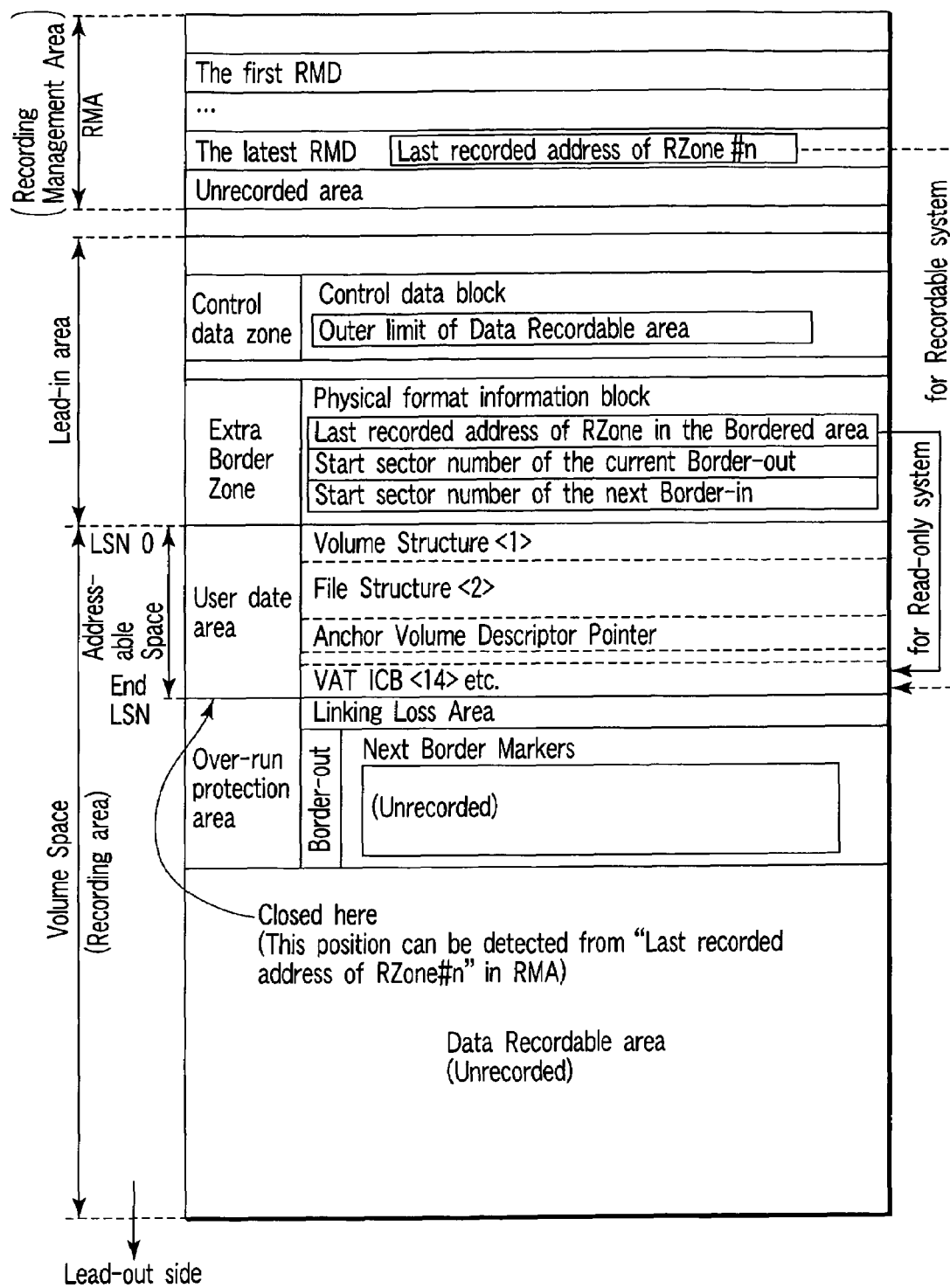
FIG. 15 is an exemplary view for explaining the state of the write-once medium which is used after initialization.

FIG. 15 is a view for explaining the state of a write-once medium used in recording after initialization. "First RMD" to "latest RMD" are written in the RMA in correspondence with the number of times of video recording, and the end position of a zone which is recorded and closed latest on the medium can be detected from the "last recorded address of Rzone#n" described in the last "latest RMD". Based on the log information (VAT_ICB with the virtual allocation table; see FIG. 13), the recorded state of the medium can be recognized.

After recording has been done on the initialized write-once medium, processing for returning this medium to the initial state can be made. This processing is premised on that a zone is temporarily closed (Rzone is temporarily closed) after initialization (in the state in which the root directory is recorded). For example, when a medium in use (DVD-R/DL disc or the like) is used in video recording halfway through and can no longer be used due to an error in the recorded area (or when the recorded area is inhibited from being accessed and that disc is reused as a new disc, although no error has occurred), this processing can be used not to repair but to return the disc to the initial state (the state immediate after the root directory is created).

The user designates initialization by operating the remote controller or the like (not shown). In response to this designation, the "last recorded address of Rzone#n (#n indicates the recorded last zone number)" in the RMA area of that disc is read to calculate the "recorded VAT_ICB" position from the position indicated by the "last recorded address of Rzone#n" to the root directory. The VAT_ICB from the calculated position to the root directory is mapped on work RAM 31 in microcomputer block 30 in FIG. 11 to calculate the current write start position (e.g., immediately after the Rzone close position) based on the "last recorded address of Rzone#n" in the RMA. The VAT_ICB mapped on work RAM 31 is written at the calculated current write start position, and the Rzone is closed at that position. After that, the disc can be reusable as a new disc from the Rzone closed position to the end of the volume space on the lead-out side in FIG. 14 (although the capacity is smaller than a new disc).

Figure 16:
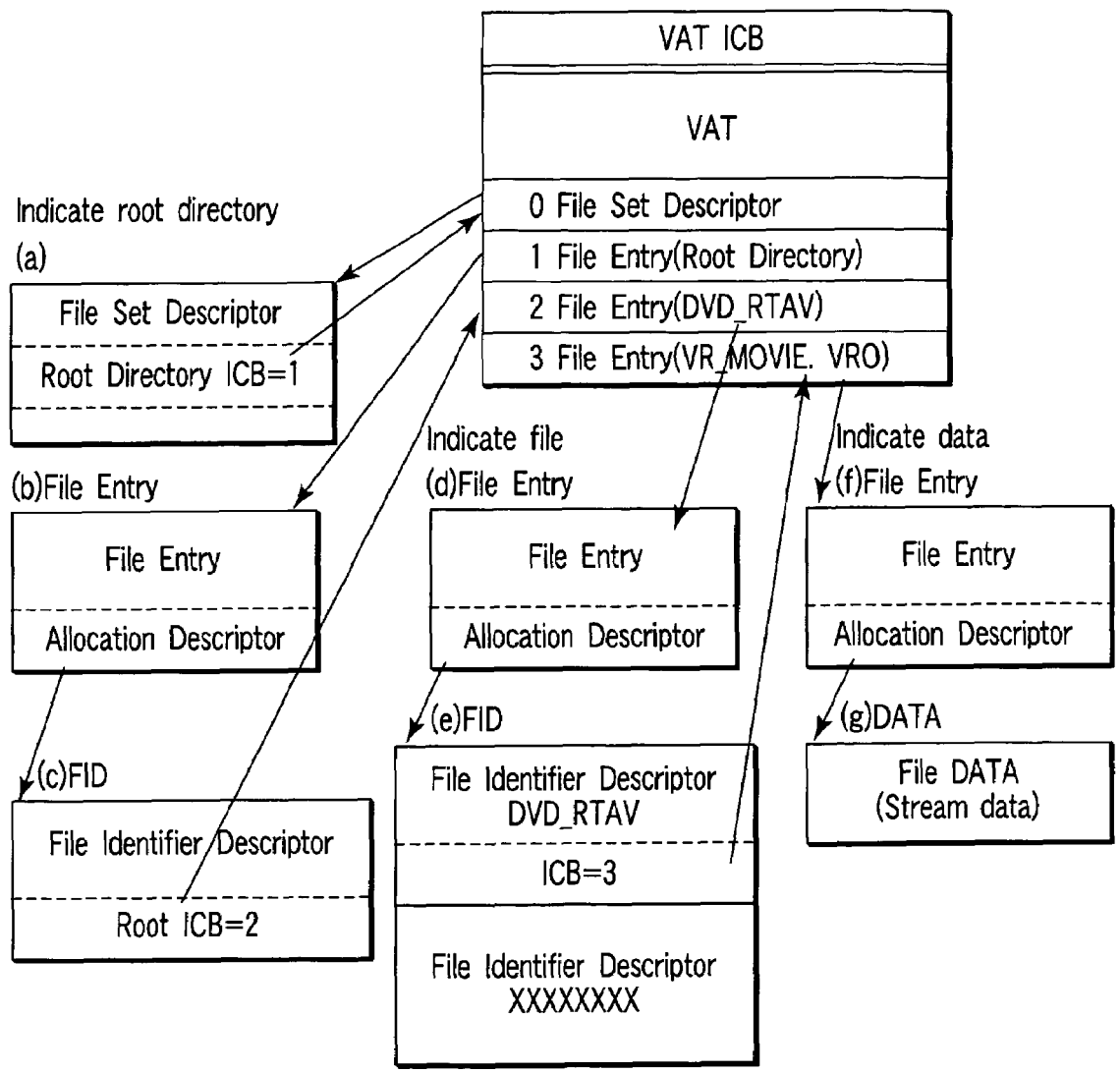
FIG. 16 is an exemplary view for explaining an example of the file structure of a DVD-R/DL (VR mode) before finalization.

FIG. 16 is a view for explaining an example of the file structure of the DVD-R/DL (VR mode) before finalization.

On the DVD-R/DL (VR), the recorded contents in the intermediate state before finalization are managed by the "VAT" described with reference to FIG. 13 and the like. That is, the allocations of the root directory, files, and data (or recorded contents corresponding to these allocations) are linked by referring to the description of the "VAT", as exemplified by arrows (a) to (g) in FIG. 16.

More specifically, file set descriptor (a) of the root directory is referred to by the first (O-th) descriptor of the VAT, and the first file entry of the VAT is referred to by root directory ICB=1 of this file set descriptor. When file entry (b) of the root directory is referred to by the first file entry of the VAT, file identifier descriptor FID (c) of the root directory is referred to by an allocation descriptor of this file entry, and the second file entry of the VAT is referred to by ICB=2 of this FID. When file entry (d) of file DVD_RTAV is referred to by the second file entry of this VAT, FID (e) of the DVD_RTAV is referred to by an allocation descriptor of this file entry, and the third file entry of the VAT is referred to by ICB=3 of this FID. When file entry (f) of object VR_MOVIE.VRO is referred to by the third file entry of the VAT, file data (g) of VR_MOVIE.VRO is referred to by an allocation descriptor of this file entry, and corresponding stream data can be accessed.

The same volume management and file management as those after finalization can be made by information management using the aforementioned "VAT" in the intermediate state of the DVD-R/DL (VR) before finalization.

Figure 4:
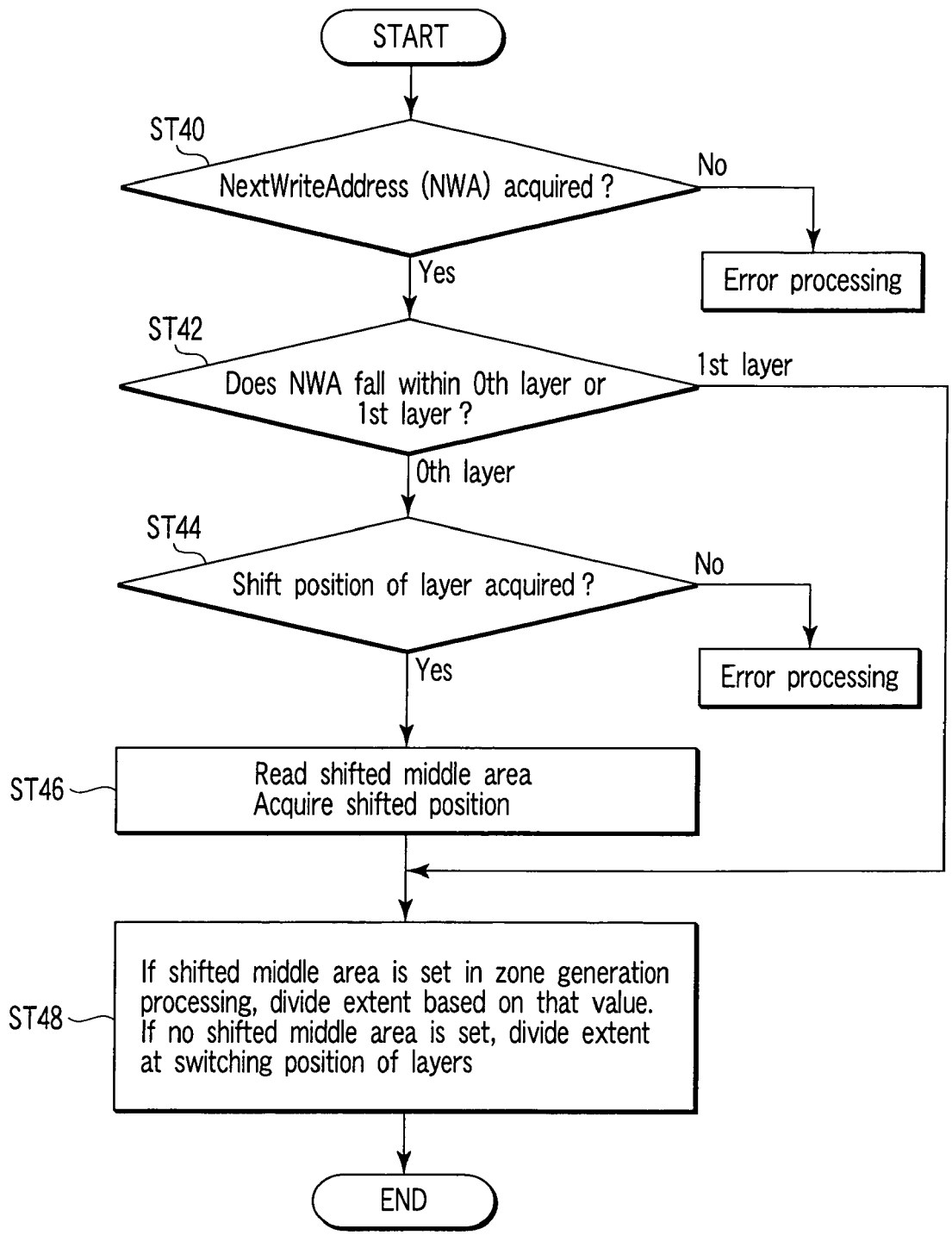
FIG. 4 is an exemplary flowchart for explaining "shifted middle area read processing" in the single-sided, multi-layer recording disc (a dual-layer disc or two neighboring layers of a disc having three or more layers on one side) according to one embodiment of the invention.

FIG. 4 is a flowchart for explaining "shifted middle area read processing" in a single-sided, multi-layer recording disc (a dual-layer disc or two neighboring layers of a disc having three or more layers on one side) according to the embodiment of the invention. Firmware of this processing is called from ROM 31a in FIG. 11 after medium (DVD-R/DL or the like) 1001 is inserted into disc drive unit 1002. After insertion of medium 1001, in processing for acquiring various kinds of information from medium 1001, information of a shifted middle area is also acquired. That is, if the write start position (NextWritableAddress: to be abbreviated as NWA hereinafter) of the medium can be acquired (YES in block ST40), it is checked if the NWA falls within the range of 0th layer L0 or 1st layer L1 (block ST42). If the NWA falls within the range of the 0th layer, a shift position of the layer (a setting value of the shifted middle area) is acquired from medium 1001 (YES in block ST44), and an extent is divided at the setting position of the shifted middle area (block ST48). The extent generation processing will be described later with reference to FIG. 9.

If the write start position (NWA) of medium 1001 does not fall within the range of 0th layer L0, the processing for acquiring the setting value of the shifted middle area (ST44 to ST46) is skipped. If acquisition of the NWA has failed or that of the shift position of the layer (the setting value of the shifted middle area) has failed, the processing shown in FIG. 4 is terminated as an error.

Figure 5:
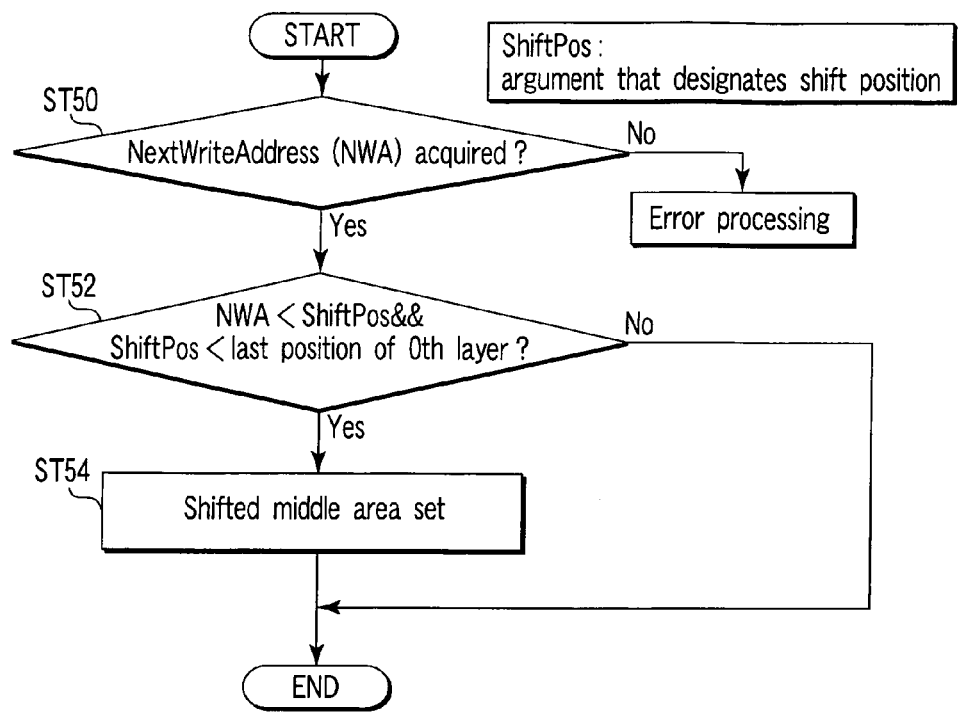
FIG. 5 is an exemplary flowchart for explaining "shifted middle area setting processing" in the single-sided, multi-layer recording disc (a dual-layer disc or two neighboring layers of a disc having three or more layers on one side) according to one embodiment of the invention.
Figure 10:
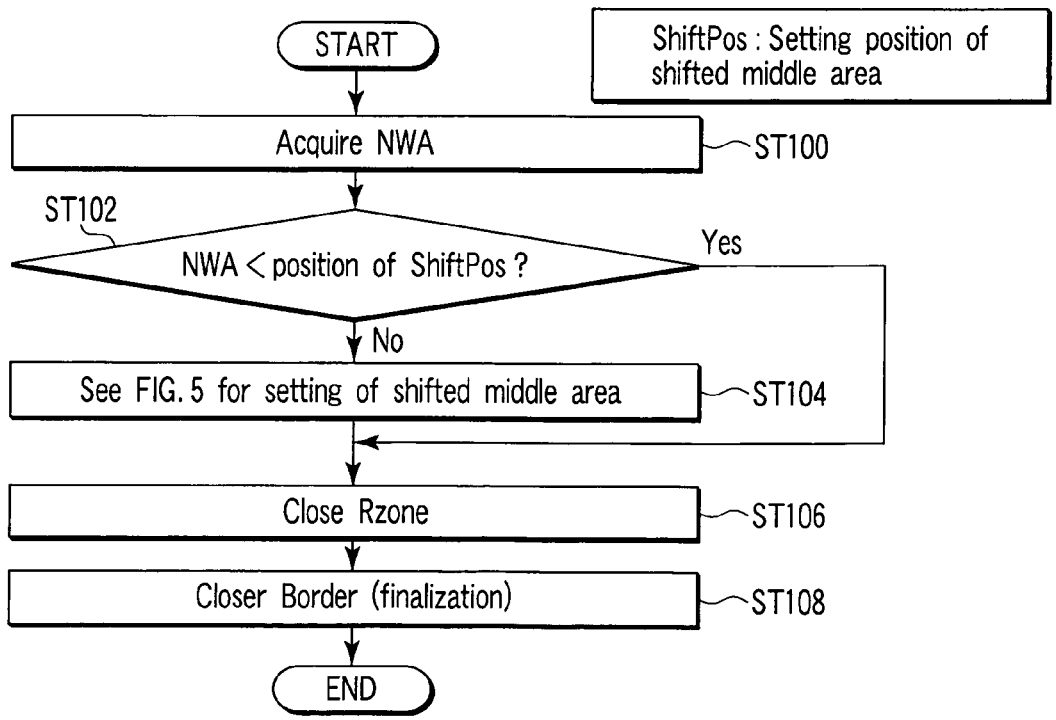
FIG. 10 is an exemplary flowchart for explaining "finalization processing" in the single-sided, multi-layer recording disc (a dual-layer disc or two neighboring layers of a disc having three or more layers on one side) according to one embodiment of the invention.

FIG. 5 is a flowchart for explaining "shifted middle area setting processing" in the single-sided, multi-layer recording disc (a dual-layer disc or two neighboring layers of a disc having three or more layers on one side) according to the embodiment of the invention. The shifted middle area setting processing (FIG. 5) is called as processing before finalization (FIG. 10). In the shifted middle area setting processing, the write start position (NWA) of medium 1001 is acquired. If acquisition of the NWA has succeeded (YES in block ST50), it is checked if an argument (ShiftPos) that designates a shift position falls within the range between the NWA position and the last position of the 0th layer. If the argument (ShiftPos) falls within that range (YES in block ST52), the shifted middle area is set based on the argument (ShiftPos) (block ST54). After the shifted middle area is set, the extent is divided at the position of the argument (ShiftPos). If the argument (ShiftPos) falls outside the range between the NWA position and the last position of the 0th layer, the extent is divided at the last position of the 0th layer.

As described above, since the shifted middle area is set before finalization, the finalization time period can be shortened (because unrecorded areas of both layer 0 and layer 1 in FIG. 3 are excluded from an area to be processed before execution of finalization).

The shifted middle area setting processing (block ST54) in FIG. 5 is done for the purpose of, e.g., reducing occurrence of write errors on the outer periphery of a medium. In other words, the shifted middle area setting processing (block ST54) is used to control the shift position (layer switching position) on the outer periphery side of the medium and to limit write accesses on the outer periphery. This processing is called from the application side having a higher level than the control program of disc drive unit 1002, and the setting of the shifted middle area is valid when the write position falls within the range of the 0th layer. (When the write position falls within the range of the 1st layer, since write processing has already used up to the fixed middle area on the outer periphery side on the 0th layer, the setting of the shifted middle area is invalid.)

Figure 6:
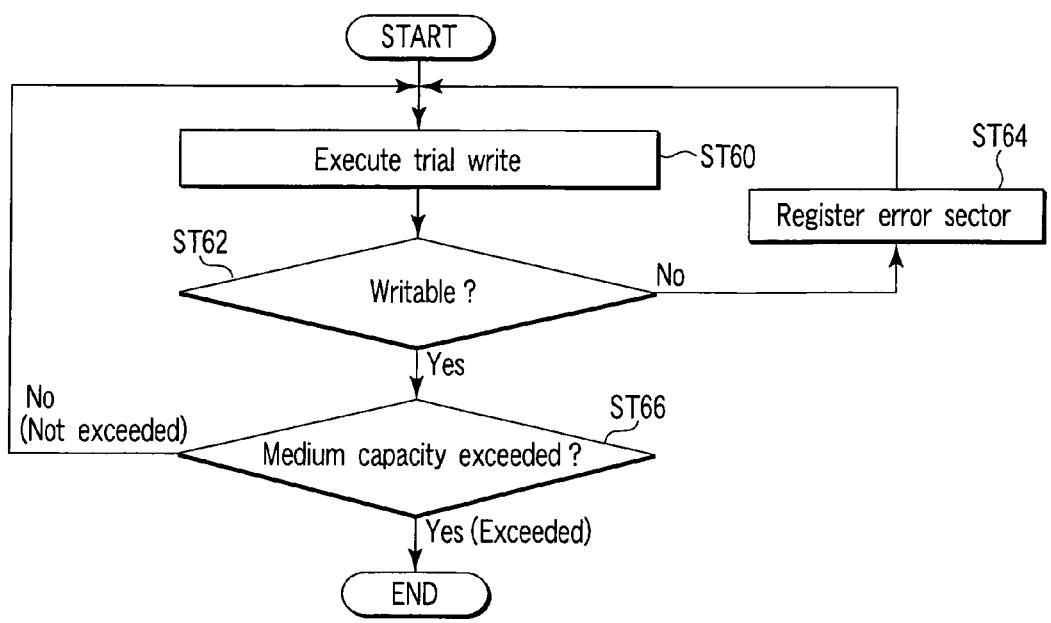
FIG. 6 is an exemplary flowchart for explaining "trial write processing" in the single-sided, multi-layer recording disc (a dual-layer disc or two neighboring layers of a disc having three or more layers on one side) according to one embodiment of the invention.

FIG. 6 is a flowchart for explaining "trial write processing" in the single-sided, multi-layer recording disc (a dual-layer disc or two neighboring layers of a disc having three or more layers on one side) according to the embodiment of the invention. Before user data is recorded on DL medium 1001, trial write is executed (block ST60). If not writable (NO in block ST62), unrecordable error sector positions of the medium are registered in a buffer or the like (not shown) in disc drive unit 1002 (block ST64). When writable (YES in block ST62), the trial write is continued if the trial write does not exceed the given medium capacity (NO in block ST66).

Although trial write processing of block ST60 progresses immediately before an actual write laser radiation, no actual laser writing will be done in the trial write processing.

Processes from this trial write to error sector registration can be implemented by sampling a predetermined range of the recorded capacity of the medium (processing loop that does not exceed the medium capacity in block ST66: for example, several ten to several hundred points from the inner periphery side to the outer periphery side of the 0th layer are sampled, and trial write is made at sectors of the sampled points, and so forth).

Incidentally, in an operation mode of the trial write processing of block ST60, it is possible to optionally execute a write command. When the write command is executed, after block ST64 (or after the first error detection), the trial write processing of FIG. 6 will be terminated. The process of FIG. 7 may be omitted when such write command option is adapted.

Figure 7:
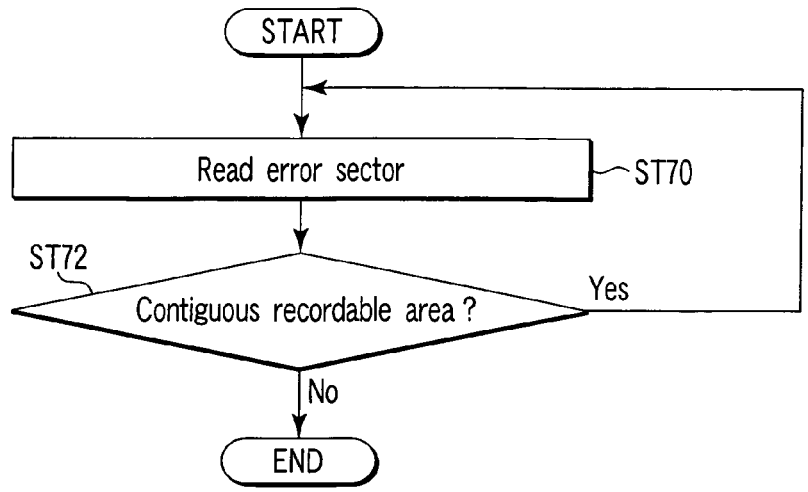
FIG. 7 is an exemplary flowchart for explaining "contiguous area calculation processing" in the single-sided, multi-layer recording disc (a dual-layer disc or two neighboring layers of a disc having three or more layers on one side) according to one embodiment of the invention.

FIG. 7 is a flowchart for explaining "contiguous area calculation processing" in the single-sided, multi-layer recording disc (a dual-layer disc or two neighboring layers of a disc having three or more layers on one side) according to the embodiment of the invention. Error sectors registered in the processing of FIG. 6 are read (block ST70). Sectors before the first error sector are read in this read operation (OK in block ST72) are determined as a contiguous recordable area. When the first error sector is read (NG in block ST72), the end point of the contiguous recordable area is detected. Upon execution of this processing, the contiguous recordable area is calculated. By executing the processing in FIG. 5 from the contiguously recordable position, the shifted middle area in FIG. 3 is set, and recording can be done across the layers while avoiding an unwritable area.

That is, in DL media in which errors are more likely to frequently occur upon writing, trial write is executed before actual recording to calculate a contiguously recordable position, thus setting the shifted middle area before an unrecordable area. In this way, recording impossibility (recording failure) can be avoided before the beginning of actual recording. (Especially, when a medium is of DVD-R type, since the already recorded part cannot be reused, that medium is more likely to be discarded if the recording failure has occurred. Since DVD-R/DL is more expensive than DVD-R/SL, this failure is costly for the user. Also, since DVD-R/DL has a longer video recording time than DVD-R/SL, waste of time for video recording before the failure is unpleasant for the user.)

Figure 8:
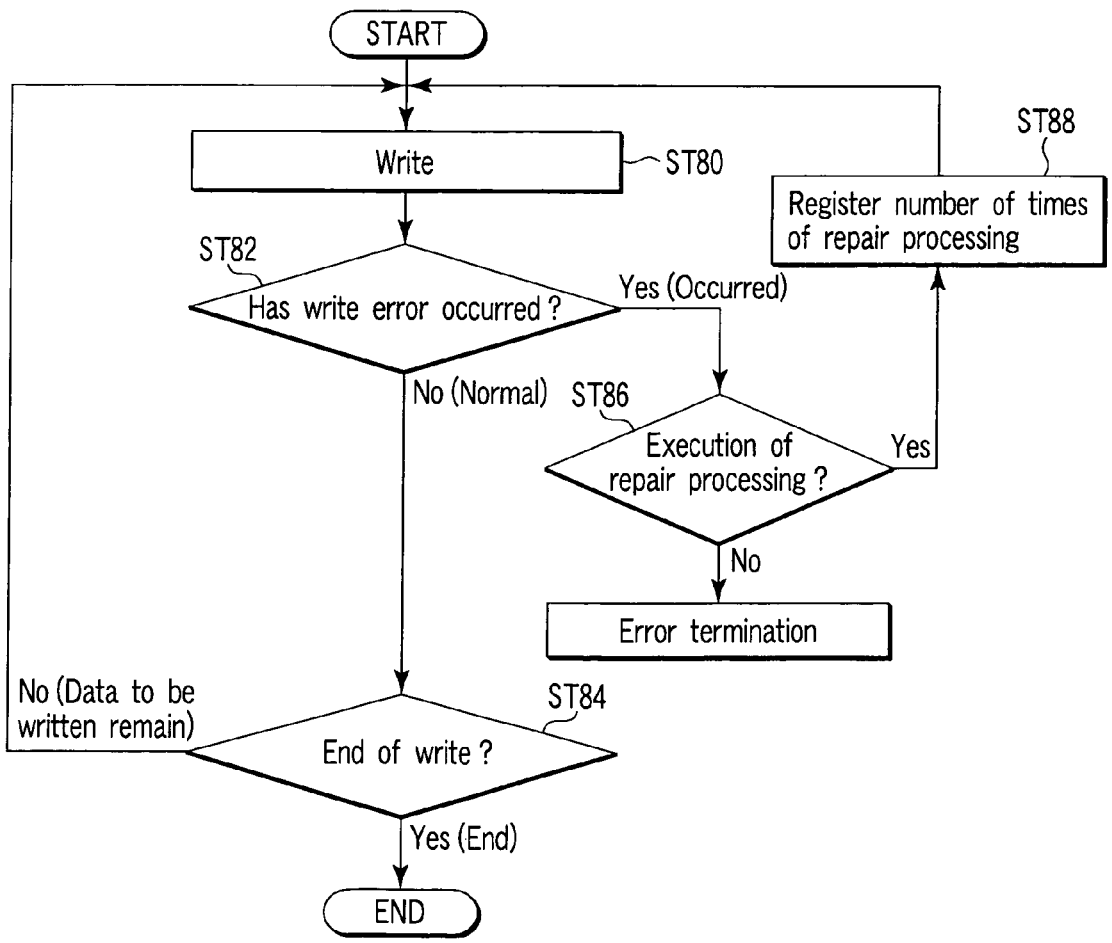
FIG. 8 is an exemplary flowchart for explaining "write error threshold calculation processing" in the single-sided, multi-layer recording disc (a dual-layer disc or two neighboring layers of a disc having three or more layers on one side) according to one embodiment of the invention.

FIG. 8 is a flowchart for explaining "write error threshold calculation processing" in the single-sided, multi-layer recording disc (a dual-layer disc or two neighboring layers of a disc having three or more layers on one side) according to the embodiment of the invention. In this write error threshold calculation processing, the number of times of repair processing (block ST86) after occurrence of a write error (blocks ST80 and ST82) is registered (block ST88), and is used as a threshold upon setting the shifted middle area. Such processing is repeated as long as write data remain (processing loop as long as it is determined in block ST84 that data to be written remain).

When the repair processing takes place frequently (for example, when repair processing is executed four to five times for occurrence of a given write error), the processing in FIG. 5 is executed in response to a command from the application on the higher level side than the control program of disc drive unit 1002. That is, in a DL medium in which repair processing takes place frequently, the number of times of repair processing is counted, and a threshold of the count value is set (in the above example, four to five times of repair processing correspond to the threshold). The shifted middle area is set at a position where the number of times of repair processing exceeds the threshold, thus making the subsequent write processing stable (hard to cause any recording failure).

Figure 9:
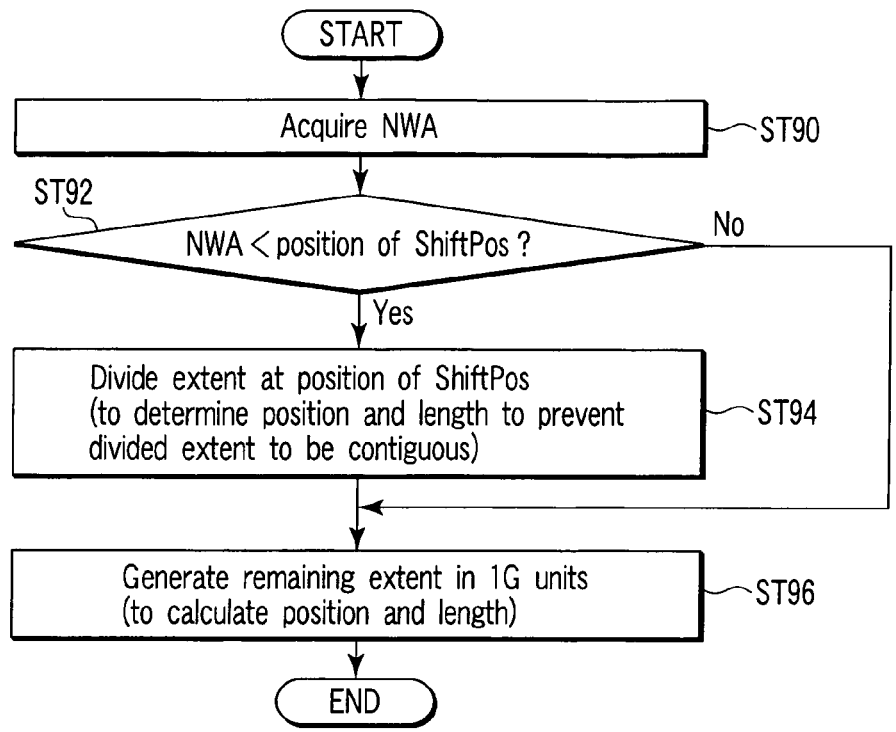
FIG. 9 is an exemplary flowchart for explaining "extent generation processing" in the single-sided, multi-layer recording disc (a dual-layer disc or two neighboring layers of a disc having three or more layers on one side) according to one embodiment of the invention.

FIG. 9 is a flowchart for explaining "extent generation processing" in the single-sided, multi-layer recording disc (a dual-layer disc or two neighboring layers of a disc having three or more layers on one side) according to the embodiment of the invention. This processing corresponds to that in block ST48 in FIG. 4. The write start position (NWA) of medium 1001 is acquired (block ST90). If the acquired NWA is smaller than the position of the argument (ShiftPos) (YES in block ST92), the extent is divided at the position of the argument (ShiftPos) (to determine the position and length of the divided extent so as to prevent the divided extent from being contiguous at the position of ShiftPos: block ST94). The argument (ShiftPos) designates a shift position (shifted middle area) within the range between the NWA position and the last position of the 0th layer of the medium. The remaining extent after division is generated by determining the position and length in 1 G units (block ST96). If the acquired NWA is equal to or larger than the position of the argument (ShiftPos) (NG in block ST92), the extent division processing (ST94) is skipped, and the flow jumps to the extent generation processing (ST96).

FIG. 10 is a flowchart for explaining "finalization processing" in the single-sided, multi-layer recording disc (a dual-layer disc or two neighboring layers of a disc having three or more layers on one side) according to the embodiment of the invention. The write start position (NWA) of medium 1001 is acquired (block ST100). If the acquired NWA is smaller than the position of the argument (ShiftPos) (NG in block ST102), the shift position (shifted middle area) of the DL medium recording layer is set at the position of the argument (ShiftPos) (block ST104). This setting can be done according to the processing in FIG. 5. After that, Rzone is closed (block ST106), and Border is closed to execute finalization (write processing of lead-in and lead-out in FIG. 3) (block ST108). If the acquired NWA exceeds the position of the argument (ShiftPos) (YES in block ST102), the shift position (shifted middle area) setting processing (ST104) is skipped, and the flow jumps to the Rzone close processing (ST106).

Summary of Features of Embodiment

01) In DL medium, the application or drive need write data to set the same recorded states of the 0th and 1st layers, and pre-processing for finalization takes much time. In the embodiment of the invention, since the application side sets the shifted middle area in the drive, recording (that of a lead-out or all'0 area) included in the pre-processing for finalization is not executed, thus shortening the finalization time.

02) In general, write errors readily occur on the outer periphery of a medium. According to a recording method that does not adopt the invention, since recording that extends across layers cannot be done without recording on the outer periphery, if write errors have occurred on the outer periphery, the medium can no longer be used. In the embodiment of the invention, the application side designates a recordable limit on the outer periphery, and the shifted middle area is set under the designated condition to limit write accesses on the outer periphery where write errors readily occur, thus suppressing the possibility of an unusable medium.

03) In some DL media, the inner periphery side of the media can undergo recording, but recording becomes harder to attain as the recording position moves toward the outer periphery side depending on their states (warps of media and the like). If the invention is not adopted, when such media are used to record on a recordable area, and the recording position reaches an unrecordable area, write errors occur frequently. According to the embodiment of the invention, since a trial write is made upon inserting a medium into the drive, positions that may cause write errors are recognized in advance, and the layer is shifted in a contiguous recordable area, thus preventing write errors from occurring frequently and allowing subsequent recording.

04) When a write error has occurred upon writing data, write retrial is repeated. In case of media on which data still cannot be written, conventionally, the media state is repaired to a writable state by repair processing to continue recording. In media with low frequencies of occurrence of write errors, the above measure can avoid problems. However, in case of media in which write errors occur frequently, even when recording can be done after the above measure, the possibility of reading of recorded data is low, and the recorded data cannot often be guaranteed. In the embodiment of the invention, for media in which write errors occur frequently, a threshold is set for the number of times of occurrence of write errors, and the shifted middle area is set based on this threshold. The layer is switched and used in this shifted middle area (to avoid use of a recordable area where the repair processing has occurred frequently), thus assuring more stable recording and playback compared to the conventional processing.

Summary 1 of Effects of Embodiment

The following effects can be expected by setting the shifted middle area.

11) The finalization processing time in a state before the 0th layer of a DL medium is used up can be shortened.

12) When the application side intentionally limits recording on the outer periphery side of a medium, control to prevent occurrence of write errors on the outer periphery side can be made.

13) A trial write is made in advance on a DL medium, and the layer is shifted before an unwritable area, thus preventing occurrence of write errors.

14) For a DL medium in which write errors have occurred frequently and repair processing has been made repetitively, the layer is shifted in the shifted middle area which is set based on the threshold of the number of times of repair processing, thus allowing stable recording.

Summary 2 of Effects of Embodiment

21) A DVD-R/DL has a larger storage capacity than a DVD-R/SL. When a short title is recorded and finalization is executed (in a state wherein a large unrecorded area remains), finalization takes much time since the same recorded states are set for the 0th and 1st layers. In case of a DL medium, by setting the shifted middle area, the recorded states of these layers can be set to be the same without recording any lead-out area or all'0 area. In this way, the finalization time can be shortened.

22) When the application side designates the setting of the shifted middle area (for the purpose of limiting recording on the outer periphery side of a medium), the rate of occurrence of write errors on the outer periphery side can be reduced.

23) A trial write is executed for a writable area of a DL medium to obtain the last position of a contiguously writable area, and the shifted middle area is set from that position. In this way, the layer is shifted at the position of the shifted middle area, and write errors on the outer periphery side from that position (in an area that does not allow contiguous write) can be avoided.

24) When data cannot be written even after a write command is repetitively issued (by the drive) upon recording on a DL medium, the number of times of repair processing is internally held. When the number of times of repair processing exceeds the threshold, the shifted middle area is set. In this way, the layer is switched at that position, and write errors can be avoided.

Summary 3 of Effects of Embodiment

31) Errors relatively readily occur due to the warp of the disc or the like in the area between the first shifted middle area and a fixed middle area on the outer periphery side of the first recording layer (0th layer L0), and the area between the fixed middle area on the outer periphery side and the second shifted middle area of the second recording layer (1st layer L1). For a disc which readily causes errors in these areas in practice, these areas can be inhibited from being used in recording. For this reason, the reliability upon recording and playback of the disc can be improved (if a reduction of the total recording capacity of that disc is allowed). In this way, the possibility of occurrence of a video recording failure during video recording or of playback impossibility of a disc which has been successfully recorded can be reduced.

32) Since the area between the first shifted middle area and fixed middle area on the outer periphery side of the first recording layer (0th layer L0), and the area between the fixed middle area on the outer periphery side and the second shifted middle area of the second recording layer (1st layer L1) need not be written with insignificant data by the pre-processing for finalization, the finalization can be completed within a short period of time.

Note that the invention is not limited to the aforementioned embodiments, and various modifications may be made based on techniques available at that time without departing from the scope of the invention when it is practiced at present or in the future. For example, a single-sided, multi-layer disc can adopt a structure in which two or more recording layers are formed within the range near 0.6 mm from the surface of a DVD-specification disc prepared by adhering two 0.6-mm thick substrates, and another recording layer is formed near 0.1 mm from that surface. The invention can be carried out for the multi-layer disc with such structure.

The respective embodiments may be combined as needed as much as possible, and combined effects can be obtained in such case. Furthermore, the embodiments include inventions of various stages, and various inventions can be extracted by appropriately combining a plurality of constituent elements disclosed in this application. For example, even when some constituent elements are omitted from all the constituent elements disclosed in the embodiments, an arrangement from which those constituent elements are omitted can be extracted as an invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A recording area determination method of determining an area range used in recording for a multi-layer recording disc which includes a first recording layer that undergoes recording from an inner periphery side toward an outer periphery side of the disc, and a second recording layer which undergoes recording from the outer periphery side toward the inner periphery side of the disc, said method comprising:

assuring a first shifted middle area at a shift position nearer to the inner periphery side by not less than a predetermined amount than a last position of the first recording layer on the outer periphery side within a range of the predetermined amount, and assuring a second shifted middle area at a position of the second recording layer which opposes the first shifted middle area assured on the first recording layer, wherein a recording area extending from the first recording layer to the second recording layer is shifted in the first shifted middle area and the second shifted middle area.

2. The method according to claim 1, wherein a trial write is made on the first recording layer from the inner periphery side toward the outer periphery side of the disc, and wherein the first shifted middle area and the second shifted middle area are set at a position where contiguous recording free from any error is made as a result of the trial write.

3. The method according to claim 1, wherein repair processing is executed when an error has occurred as a result of write execution, the number of times of repair processing is registered, and when it is detected that the number of times of repair processing exceeds a predetermined threshold, the first shifted middle area and the second shifted middle area are set at the detection position.

4. The method according to claim 1, wherein a lead-in area and a lead-out area are recorded before and after the recording area extending from the first recording layer to the second recording layer for the recording area which is shifted in the first shifted middle area and the second shifted middle area.

5. An apparatus for performing recording or playback on a multi-layer recording disc which includes a first recording layer that undergoes recording from an inner periphery side toward an outer periphery side of the disc, and a second recording layer which undergoes recording from the outer periphery side toward the inner periphery side of the disc, said apparatus comprising:

a first block configured to assure a first shifted middle area at a shift position nearer to the inner periphery side by not less than a predetermined amount than a last position of the first recording layer on the outer periphery side within a range of the predetermined amount;

a second block configured to assure a second shifted middle area at a position of the second recording layer which opposes the first shifted middle area assured on the first recording layer; and a third block configured to record information or play back information on or from a recording area which is determined by shifting a recording area extending from the first recording layer to the second recording layer in the first shifted middle area and the second shifted middle area.

6. The apparatus according to claim 5, further comprising:
a fourth block configured to make a trial write on the first recording layer from the inner periphery side toward the outer periphery side of the disc; and
a fifth block configured to set the first shifted middle area and the second shifted middle area at a position where contiguous recording free from any error is made as a result of the trial write.

7. The apparatus according to claim 5, further comprising:
a sixth block configured to execute repair processing when an error has occurred as a result of write execution;
a seventh block configured to register the number of times of repair processing; and
an eighth block configured to set, when it is detected that the number of times of repair processing exceeds a predetermined threshold, the first shifted middle area and the second shifted middle area at the detection position.

8. The apparatus according to claim 5, further comprising:
a ninth block configured to record a lead-in area and a lead-out area before and after the recording area extending from the first recording layer to the second recording layer for the recording area which is shifted in the first shifted middle area and the second shifted middle area.

* * * * *